US011119332B2

(12) United States Patent
Lee et al.

(10) Patent No.: US 11,119,332 B2
(45) Date of Patent: *Sep. 14, 2021

(54) CAMERA MODULE AND REFLECTING MODULE

(71) Applicant: SAMSUNG ELECTRO-MECHANICS CO., LTD., Suwon-si (KR)

(72) Inventors: Ta Kyoung Lee, Suwon-si (KR); Ah Hyeon Im, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/534,107

(22) Filed: Aug. 7, 2019

(65) Prior Publication Data
US 2019/0361261 A1    Nov. 28, 2019

Related U.S. Application Data

(63) Continuation of application No. 15/812,357, filed on Nov. 14, 2017, now Pat. No. 10,416,473.

(30) Foreign Application Priority Data

Jul. 3, 2017 (KR) .................. 10-2017-0084313

(51) Int. Cl.
*G02B 27/64* (2006.01)
*G02B 7/182* (2021.01)
(Continued)

(52) U.S. Cl.
CPC ......... *G02B 27/646* (2013.01); *G02B 7/1821* (2013.01); *H04N 5/2254* (2013.01); *H04N 5/2257* (2013.01); *G02B 7/021* (2013.01)

(58) Field of Classification Search
None
See application file for complete search history.

(56) References Cited

U.S. PATENT DOCUMENTS 5,231,445 A * 7/1993 Onuki .................. G03B 7/0807
396/55
5,559,574 A * 9/1996 Kai .......................... G03B 5/00
348/208.11

(Continued)

FOREIGN PATENT DOCUMENTS

CN        2800328 Y    7/2006
CN        1908736 A    2/2007

(Continued)

OTHER PUBLICATIONS

Chinese Office Action dated Feb. 3, 2020 in counterpart Chinese Patent Application No. 201810077218.5 (12 pages in English and 9 pages in Chinese).

(Continued)

*Primary Examiner* — Derek S. Chapel
(74) *Attorney, Agent, or Firm* — NSIP Law

(57) ABSTRACT

A camera module includes: a housing having an internal space; a reflecting module including a reflecting member and including a moving holder movably supported by an inner wall of the housing disposed in the internal space; and a lens module disposed behind the reflecting module disposed in the internal space and including a lens barrel including lenses aligned in an optical axis direction so that light reflected from the reflecting member is incident thereto, wherein the moving holder is provided to be movable in one axis direction approximately perpendicular to the optical axis direction with respect to the housing, and the lens module is provided with a carrier to which the lens barrel is supported, configured to be movable in the other (Continued)

axis direction approximately perpendicular to the optical axis direction and the one axis direction with respect to the housing.

23 Claims, 29 Drawing Sheets

(51) Int. Cl.
*G02B 7/02* (2021.01)
*H04N 5/225* (2006.01)

(56) References Cited

U.S. PATENT DOCUMENTS

| | | | |
|---|---|---|---|
| 9,020,334 | B1 | 4/2015 | Suzuka |
| 10,334,146 | B2 * | 6/2019 | Im .................... G02B 15/14 |
| 10,416,473 | B2 * | 9/2019 | Lee ..................... G02B 7/1821 |
| 10,816,756 | B2 * | 10/2020 | Lee ....................... G02B 7/003 |
| 2004/0141065 | A1 | 7/2004 | Hara et al. |
| 2006/0268431 | A1 | 11/2006 | Jin |
| 2007/0009244 | A1 | 1/2007 | Takahashi |
| 2007/0031134 | A1 | 2/2007 | Kuroda et al. |
| 2007/0047934 | A1 | 3/2007 | Otaka |
| 2007/0285520 | A1 | 12/2007 | Kuroda |
| 2009/0046366 | A1 | 2/2009 | Take |
| 2009/0180202 | A1 * | 7/2009 | Knoedgen ............ H04N 5/2254 359/824 |
| 2010/0295952 | A1 | 11/2010 | Oh et al. |
| 2014/0009631 | A1 | 1/2014 | Topliss |
| 2014/0063604 | A1 | 3/2014 | Wada |
| 2018/0095293 | A1 | 4/2018 | Yeon et al. |
| 2018/0217475 | A1 | 8/2018 | Goldenberg et al. |
| 2018/0239162 | A1 | 8/2018 | Lee et al. |
| 2018/0367714 | A1 | 12/2018 | Im et al. |
| 2019/0187255 | A1 * | 6/2019 | Jang ........................ G02B 7/021 |
| 2020/0026160 | A1 * | 1/2020 | Kobayashi ......... H04N 5/23258 |
| 2020/0036899 | A1 * | 1/2020 | Tanaka ............... H04N 5/23287 |

FOREIGN PATENT DOCUMENTS

| | | |
|---|---|---|
| CN | 101369048 A | 2/2009 |
| CN | 101401023 A | 4/2009 |
| CN | 101893803 A | 11/2010 |
| KR | 10-2007-0109840 A | 11/2007 |
| KR | 10-2016-0042066 A | 4/2016 |
| KR | 10-2018-0037877 A | 4/2018 |
| WO | WO 2007/091112 A1 | 8/2007 |
| WO | 2015/021279 A1 | 2/2015 |

OTHER PUBLICATIONS

Korean Office Action dated May 10, 2021, in Counterpart Korean Patent Application No. 10-2017-0084313 (8 pages in English and 6 pages in Korean).

* cited by examiner

CAMERA MODULE AND REFLECTING MODULE

CROSS-REFERENCE TO RELATED APPLICATIONS

This application is a Continuation Application of U.S. patent application Ser. No. 15/812,357 filed on Nov. 14, 2017, which claims benefit of priority under 35 U.S.C. 119(a) of Korean Patent Application No. 10-2017-0084313 filed on Jul. 3, 2017, in the Korean Intellectual Property Office, the entire disclosures of which are incorporated herein by reference for all purposes.

BACKGROUND

1. Field

The following description relates to a camera module.

2. Description of Related Art

Recently, camera modules have been generally installed in portable electronic devices such as tablet personal computers (PCs), laptop computers, and the like, in addition to smartphones, and an auto-focusing function, an optical image stabilization (OIS) function, a zoom function, and the like, have been added to camera modules for mobile terminals.

However, in order to implement various functions, the structures of camera modules have become complicated and the sizes of camera modules have increased, resulting in difficulty in mounting camera modules in portable electronic devices in which camera modules are to be mounted.

In addition, when a lens or an image sensor is directly moved for the purpose of optical image stabilization, both a weight of the lens or the image sensor itself, and weights of other members to which the lens or the image sensor is attached, should be considered, and a certain level of driving force or more is thus required, resulting in increased power consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having an internal space, a reflecting module disposed in the internal space and including a reflecting member and a moving holder movably supported by an inner wall of the housing and a lens module disposed behind the reflecting module in the internal space, including a lens barrel comprising lenses aligned in an optical axis direction configured such that light reflected from the reflecting member is incident to the lenses, wherein the moving holder is configured to be movable in one axis direction approximately perpendicular to the optical axis direction with respect to the housing, and wherein the lens module comprises a carrier supporting the lens barrel and configured to be movable in another axis direction approximately perpendicular to the optical axis direction and the one axis direction with respect to the housing.

The moving holder may be configured to be rotatable around the other axis with respect to the housing.

Two or more ball bearings may be disposed between the moving holder and the housing, wherein the two or more ball bearings are aligned on the other axis.

The ball bearings may be disposed in the moving holder or the housing to be freely movable.

The ball bearings may have a spherical or a cylindrical shape.

The ball bearings may be fixedly disposed in the moving holder or the housing.

The ball bearings may have a spherical shape, a hemispherical shape, a cylindrical shape, a semi-cylindrical shape, or a rounded protrusion shape.

The moving holder may be configured to move linearly along one axis with respect to the housing.

Two or more ball bearing sets may be disposed between the moving holder and the housing, wherein two or more ball bearing sets are disposed to be aligned in the one axis direction.

The ball bearing sets may be fixedly disposed in the moving holder or the housing or are provided in the moving holder or the housing to be freely movable.

The housing and the moving holder may include a pulling magnet or a pulling yoke, respectively, and the moving holder may be supported by the inner wall of the housing by attractive force between the pulling magnet and the pulling yoke.

Two or more ball bearing sets may be aligned in the other axis direction and may be disposed between the lens barrel and the carrier.

The lens barrel may include a pulling yoke allowing the lens barrel to be supported by the carrier by attractive force between the pulling yoke and a driving magnet of the carrier.

The carrier may include a stopper preventing separation of the lens barrel.

The carrier may be configured to be movable in the optical axis direction with respect to the housing.

A main board may be disposed on side surfaces and a bottom surface of the housing, wherein the main board has coils for driving the lens module and the reflecting module mounted thereon.

The main board may be a double-sided substrate, the coils may be mounted on an inner surface of the main board toward the internal space of the housing, and a gyro sensor may be mounted on an outer surface of the main board opposing the inner surface of the main board.

A portable electronic device may include the camera module.

The optical axis of the lenses may be in a direction generally perpendicular to a thickness direction of the portable electronic device.

BRIEF DESCRIPTION OF DRAWINGS

Other features and aspects will be apparent from the following detailed description, the drawings, and the claims.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
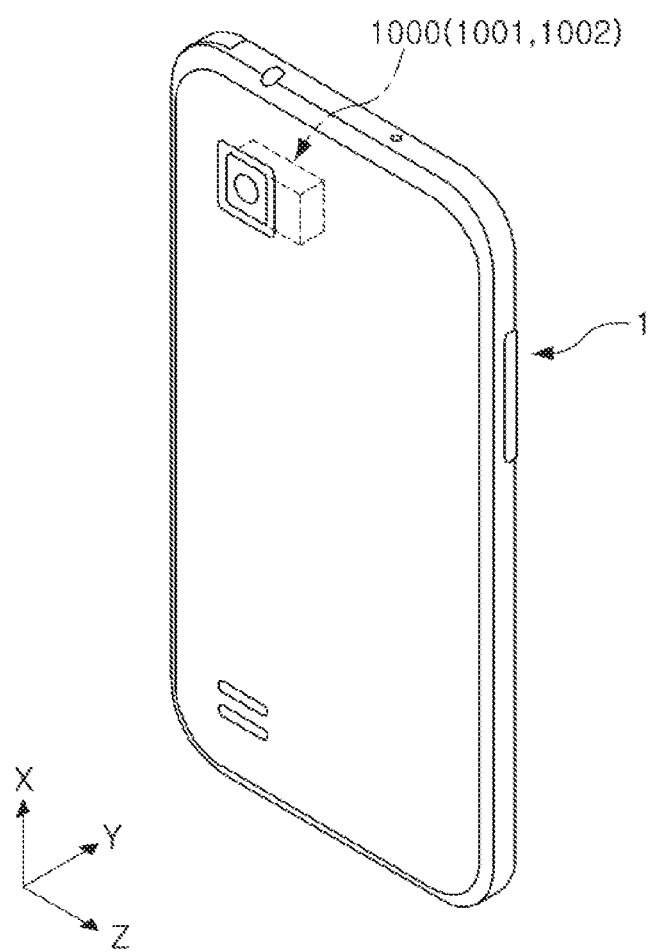
FIG. 1 is a perspective view of a portable electronic device according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a perspective view illustrating a portable electronic device according to an embodiment.

Referring to FIG. 1, a portable electronic device 1 according to an embodiment may be a portable electronic device such as a mobile communications terminal, a smartphone, a tablet personal computer (PC), in which a camera module 1000: 1001 or 1002 is mounted.

As illustrated in FIG. 1, the portable electronic device 1 is provided with the camera module 1000 to capture an image of a subject.

In the embodiment, the camera module 1000: 1001 or 1002 includes a plurality of lenses, and an optical axis (a Z axis) of each of the lenses is directed in a direction perpendicular to a thickness direction (a Y-axis direction or a direction from a front surface of the portable electronic device to a rear surface thereof or an opposite direction to the direction from the front surface of the portable electronic device to the rear surface thereof) of the portable electronic device 1.

As an example, the optical axis (the Z axis) of each of the lenses included in the camera module 1000 is formed in a width direction or a length direction of the portable electronic device 1.

Therefore, even though the camera module 1000 has functions such as an auto-focusing (AF) function, a zoom function, an optical image stabilization (hereinafter, referred to as OIS) function, a thickness of the portable electronic device 1 is not increased. Therefore, the portable electronic device 1 may be miniaturized.

The camera module 1000 according to an embodiment may have one or more of the AF function, the zoom function, and the OIS function.

Since the camera module 1000 including the AF function, the zoom function, the OIS function needs to include various components, a size of the camera module may be increased as compared to a general camera module.

When the size of the camera module 1000 is increased, a problem may occur in miniaturizing the portable electronic device 1 in which the camera module 1000 is mounted.

For example, when the number of stacked lenses in the camera module is increased for the purpose of the zoom function and stacked lenses are disposed in the camera module in the thickness direction of the portable electronic device, a thickness of the portable electronic device is also increased depending on the number of stacked lenses. Therefore, when the thickness of the portable electronic device is not increased, the number of stacked lenses may not be sufficiently secured, such that zoom performance will deteriorate.

In addition, an actuator moving a lens group generally in an optical axis direction or a direction substantially perpendicular to the optical axis needs to be installed in order to implement the AF function and the OIS function, and when the optical axis (the Z axis) of the lens group is formed in the thickness direction of the portable electronic device, the actuator moving the lens group needs also to be installed in the thickness direction of the portable electronic device. Therefore, a thickness of the portable electronic device will increase.

However, in the camera module 1000 according to an embodiment, the optical axis (the Z axis) of each of the lenses is generally disposed perpendicularly to the thickness direction of the portable electronic device 1. Therefore, even though the camera module 1000 having the AF function, the zoom function, and the OIS function is mounted in the portable electronic device 1, the portable electronic device 1 may be miniaturized.

Figure 2:
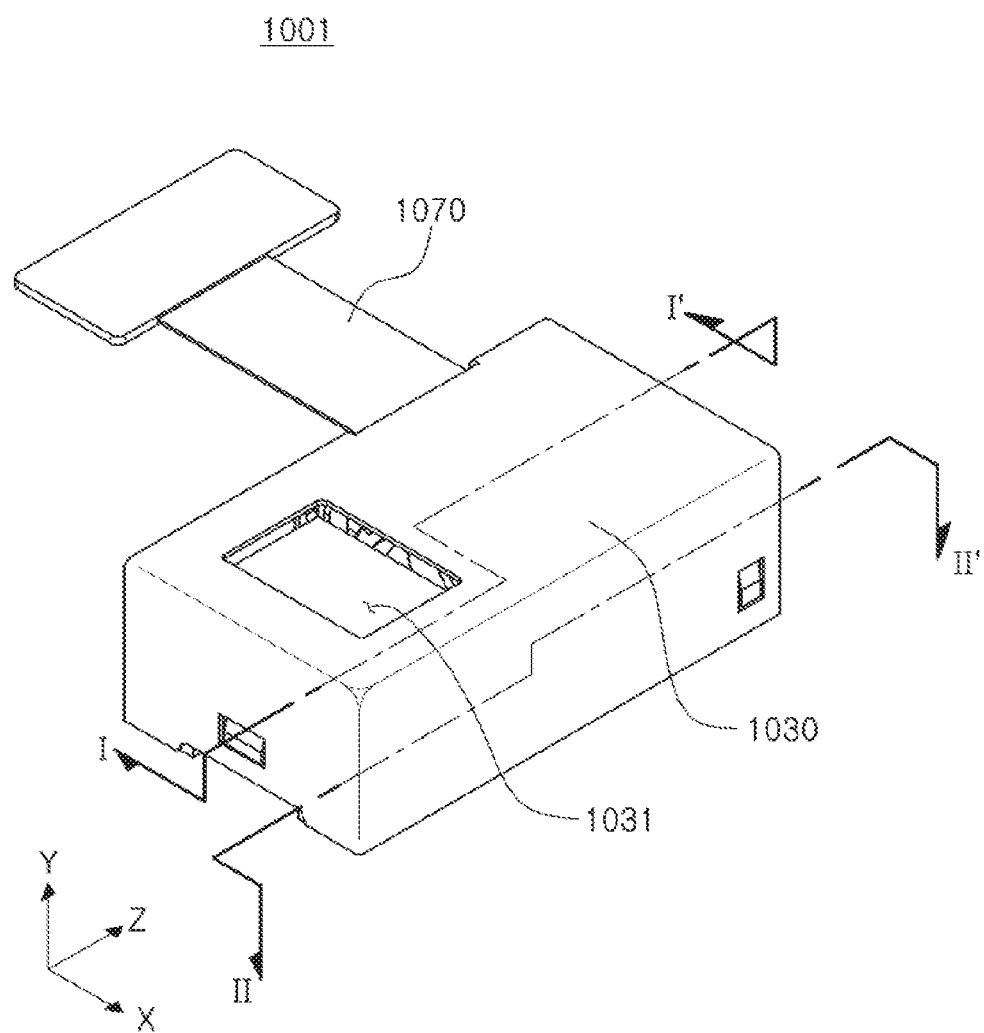
FIG. 2 is a perspective view of a camera module according to an embodiment.
Figure 3:
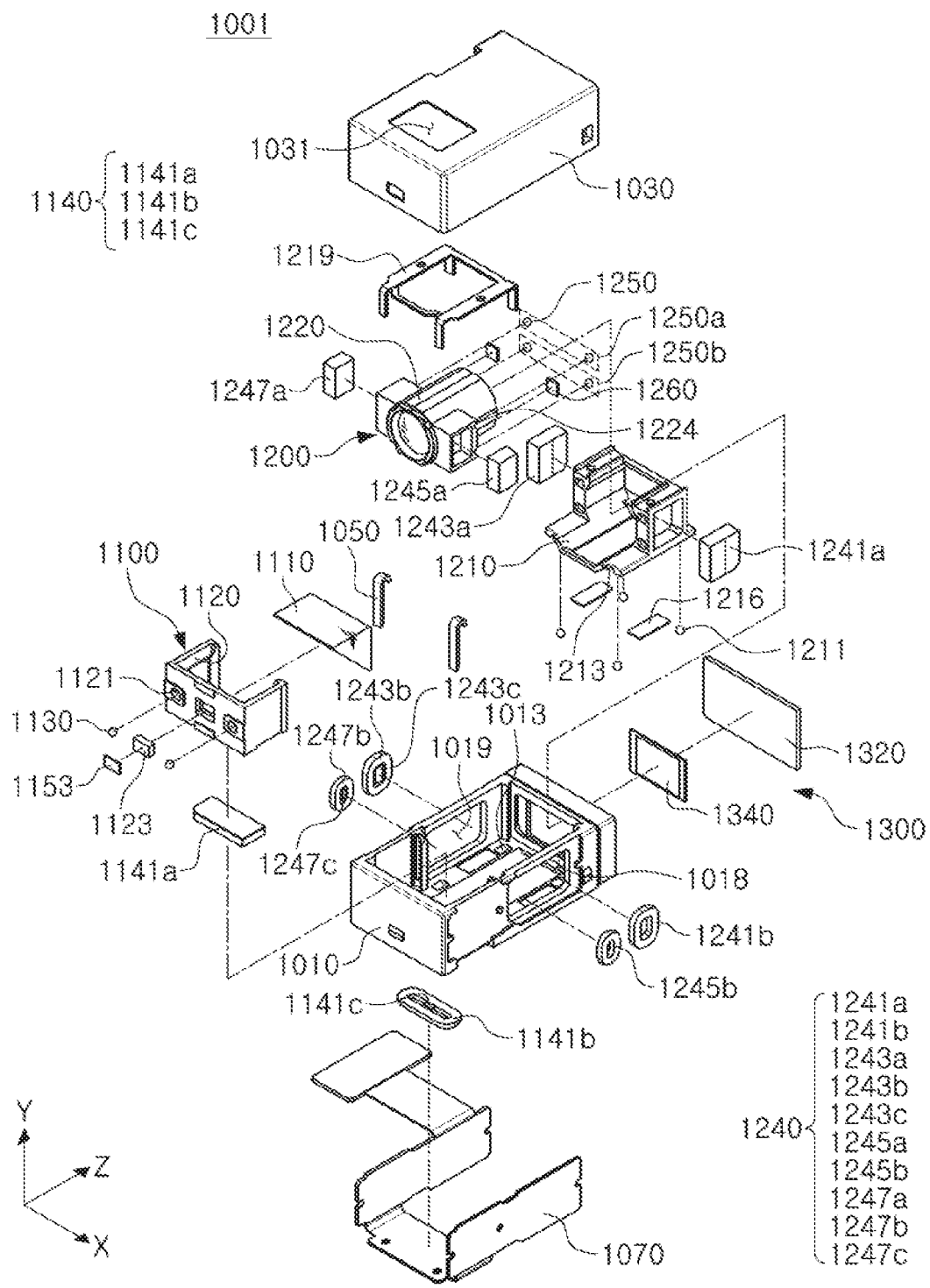
FIG. 3 is an exploded perspective view of a camera module according to an embodiment.
Figure 4A:
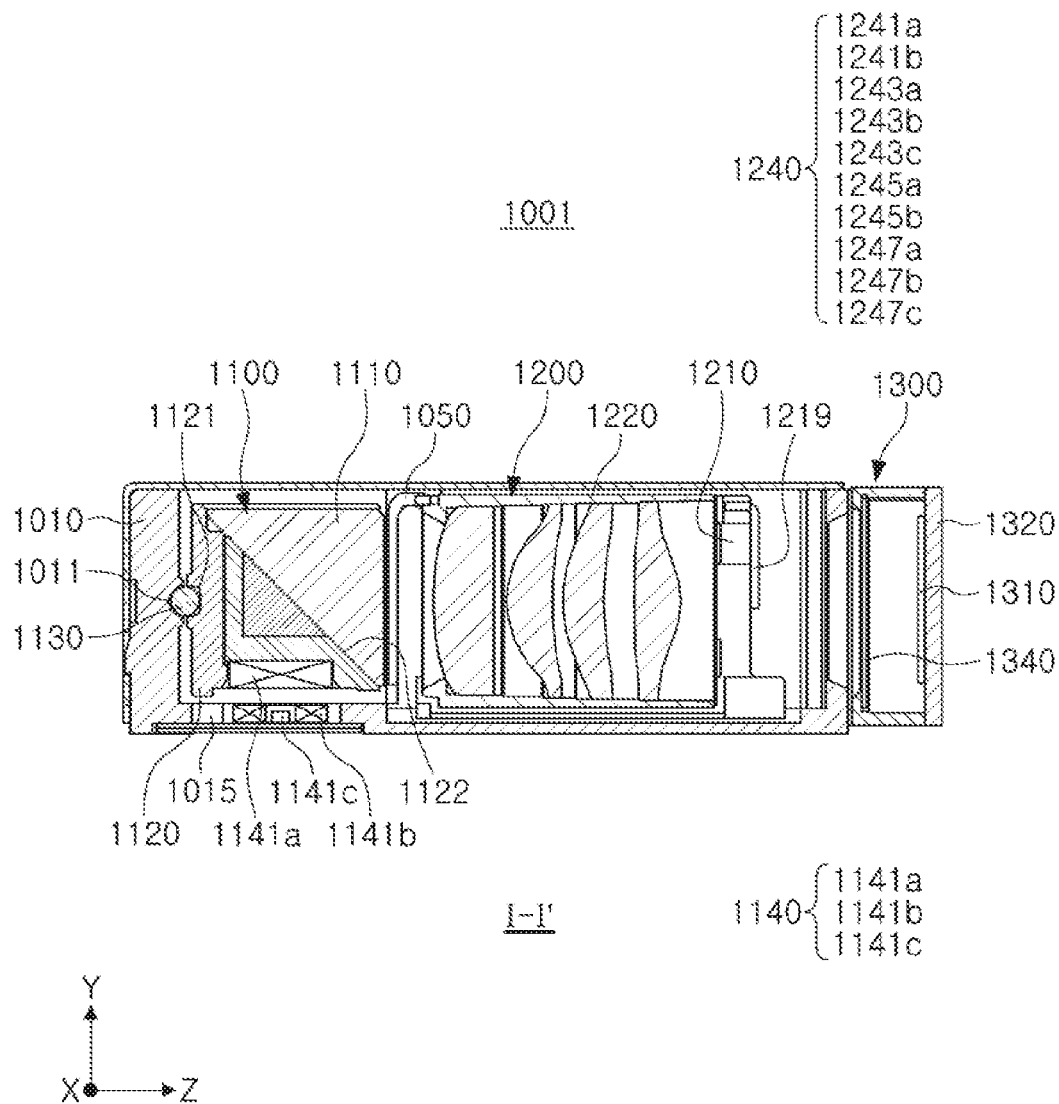
FIGS. 4A and 4B are cross-sectional views of a camera module according to an embodiment.
Figure 4B:
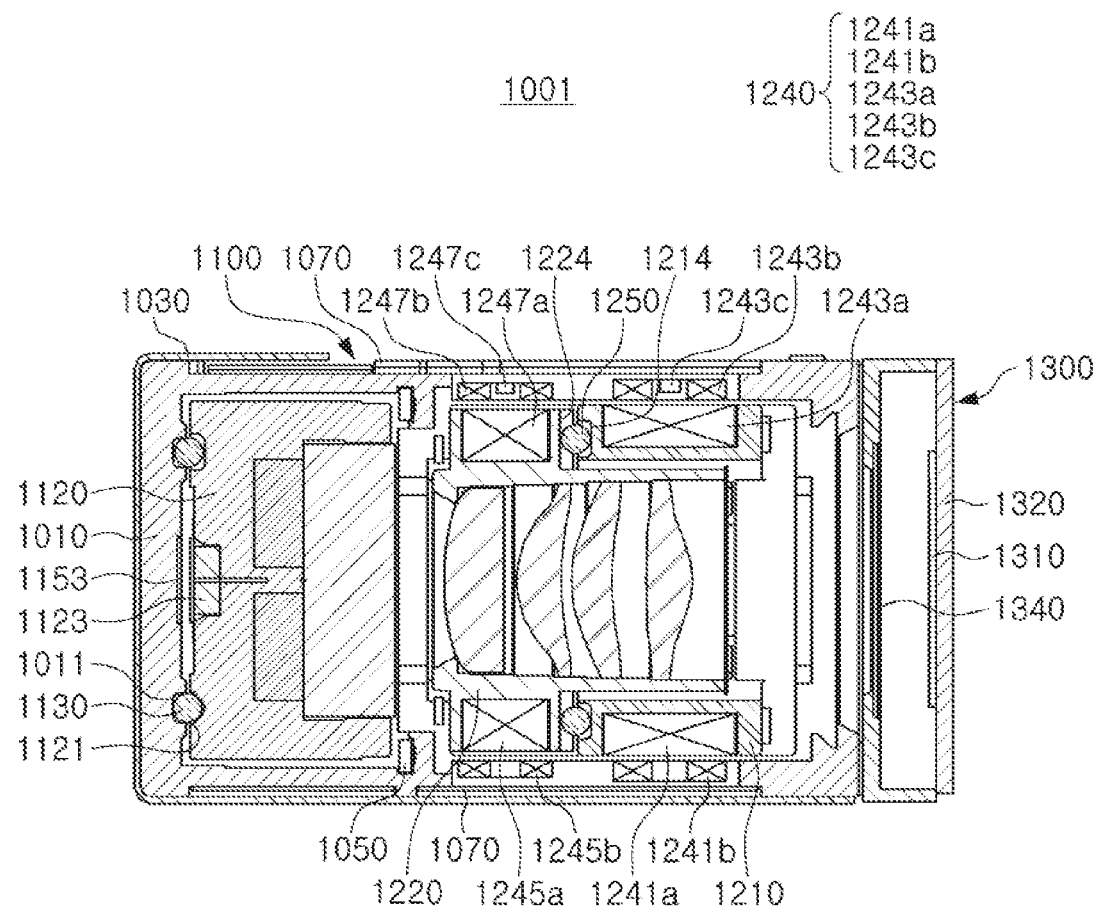
Figure 5:
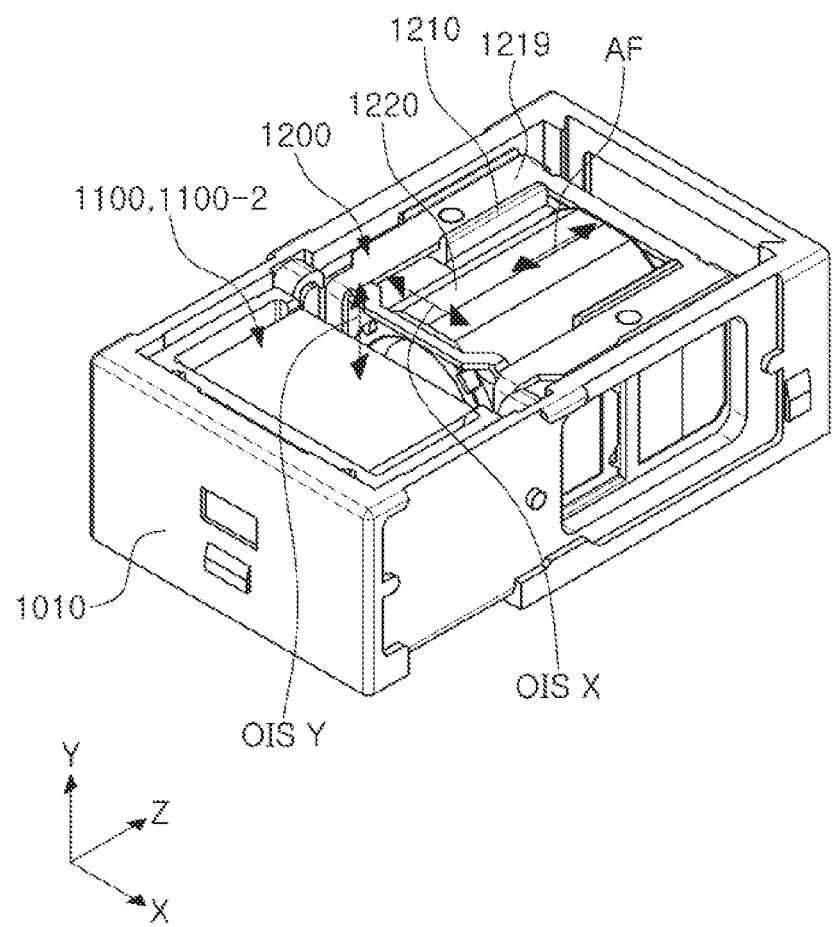
FIG. 5 is a perspective view showing that a reflection module and a lens module are coupled to a housing of a camera module according to embodiments.
Figure 6:
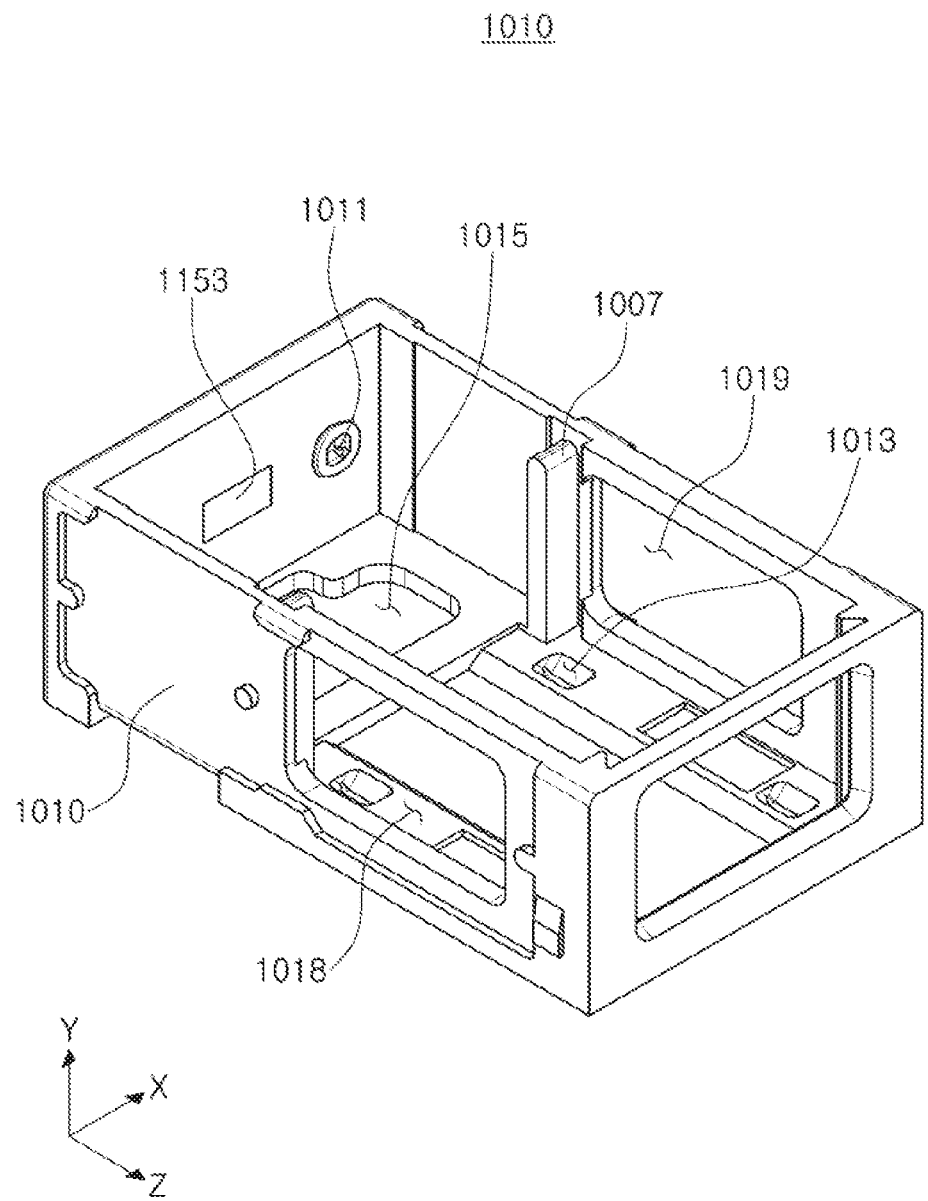
FIG. 6 is a perspective view of a housing of the camera module according to an embodiment.
Figure 7:
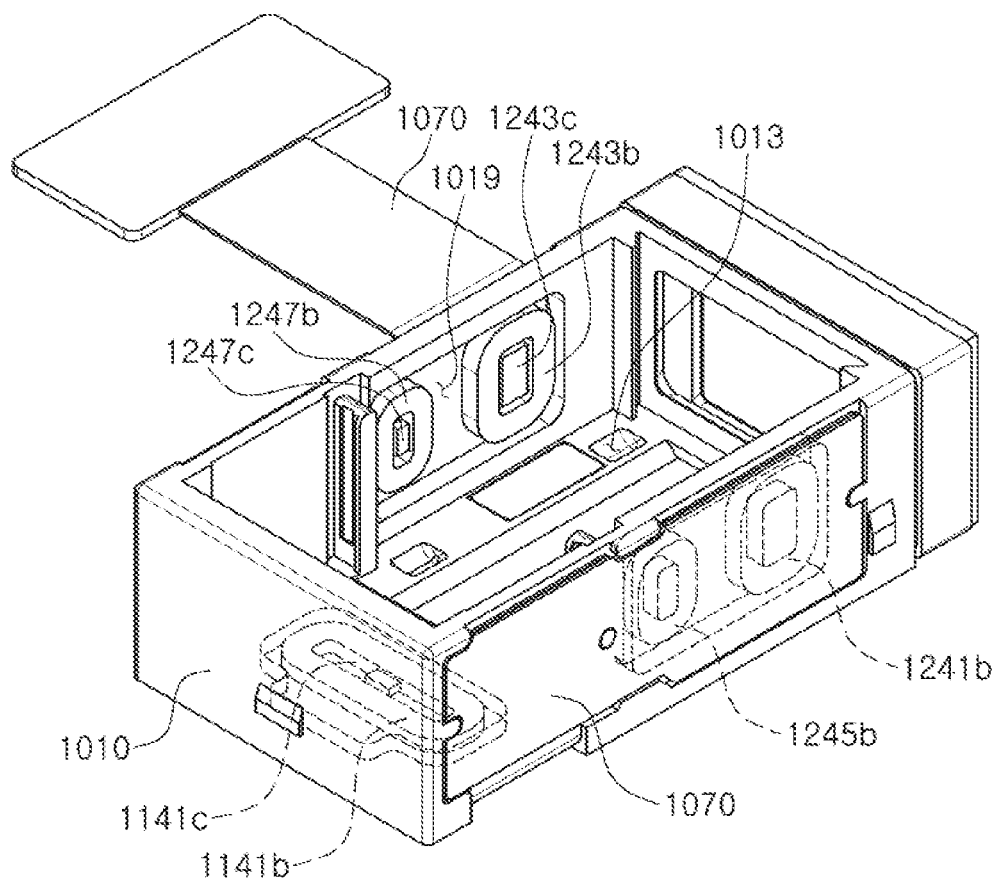
FIG. 7 is a perspective view showing that a board having driving coils mounted thereon is coupled to the housing of the camera module according to embodiments.
Figure 12:
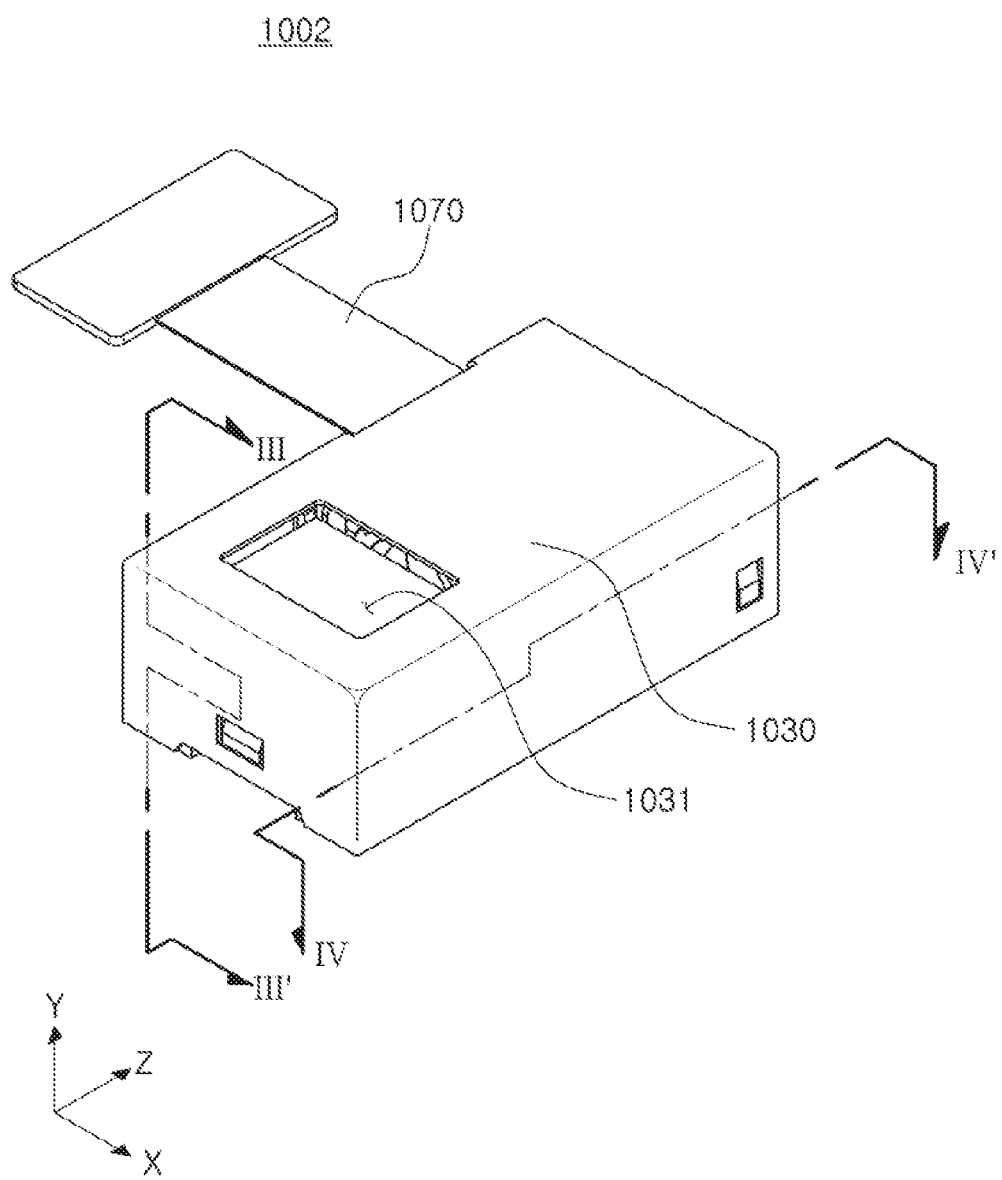
FIG. 12 is a perspective view of a camera module according to an embodiment.
Figure 13:
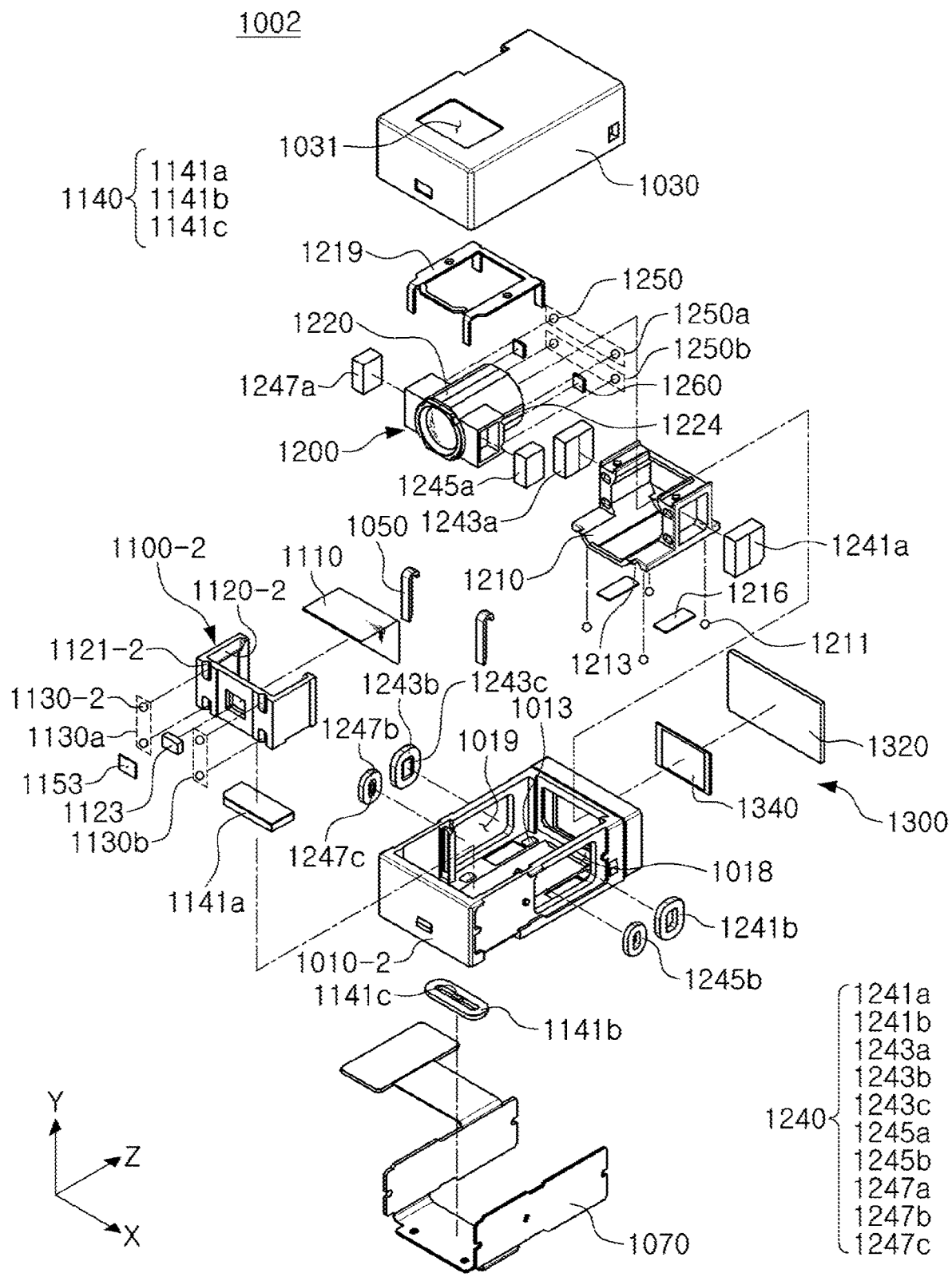
FIG. 13 is an exploded perspective view of a camera module according to an embodiment.
Figure 14A:
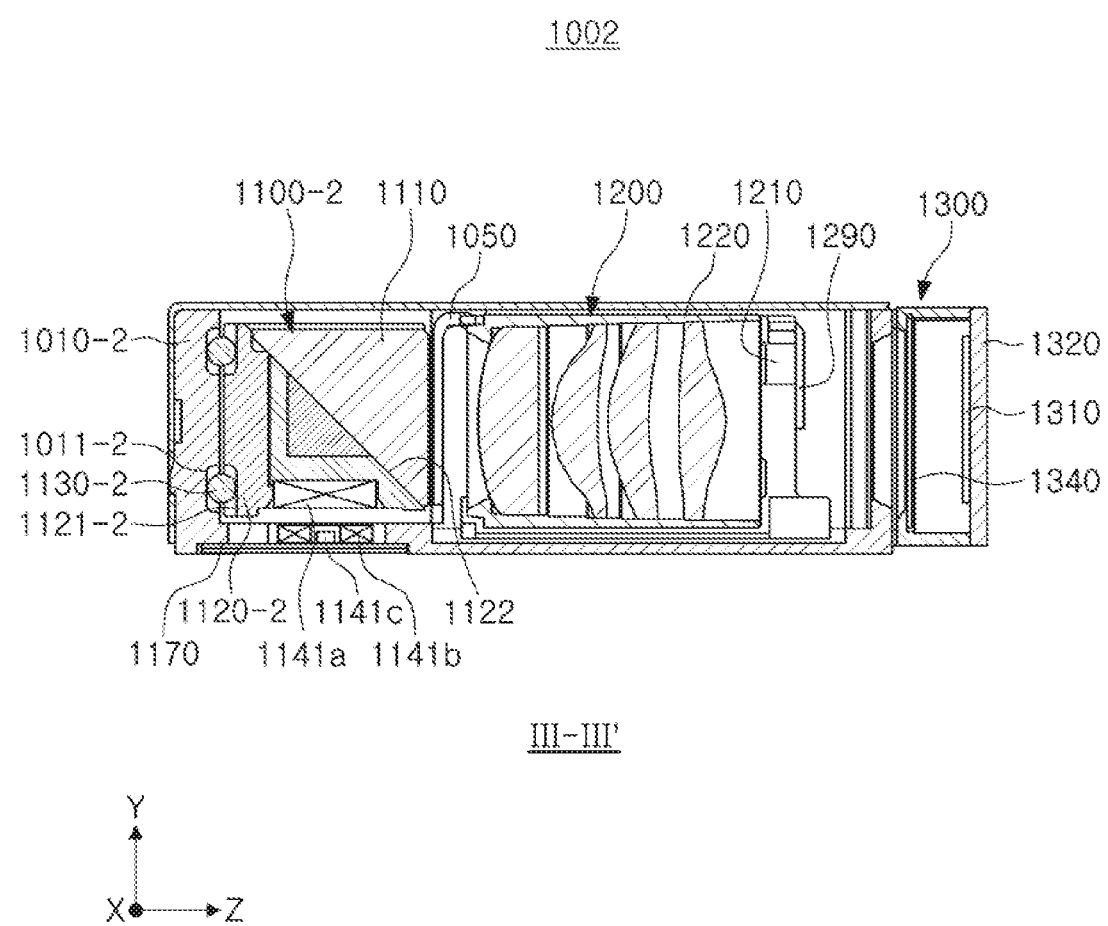
FIGS. 14A and 14B are cross-sectional views of a camera module according to an embodiment.
Figure 14B:
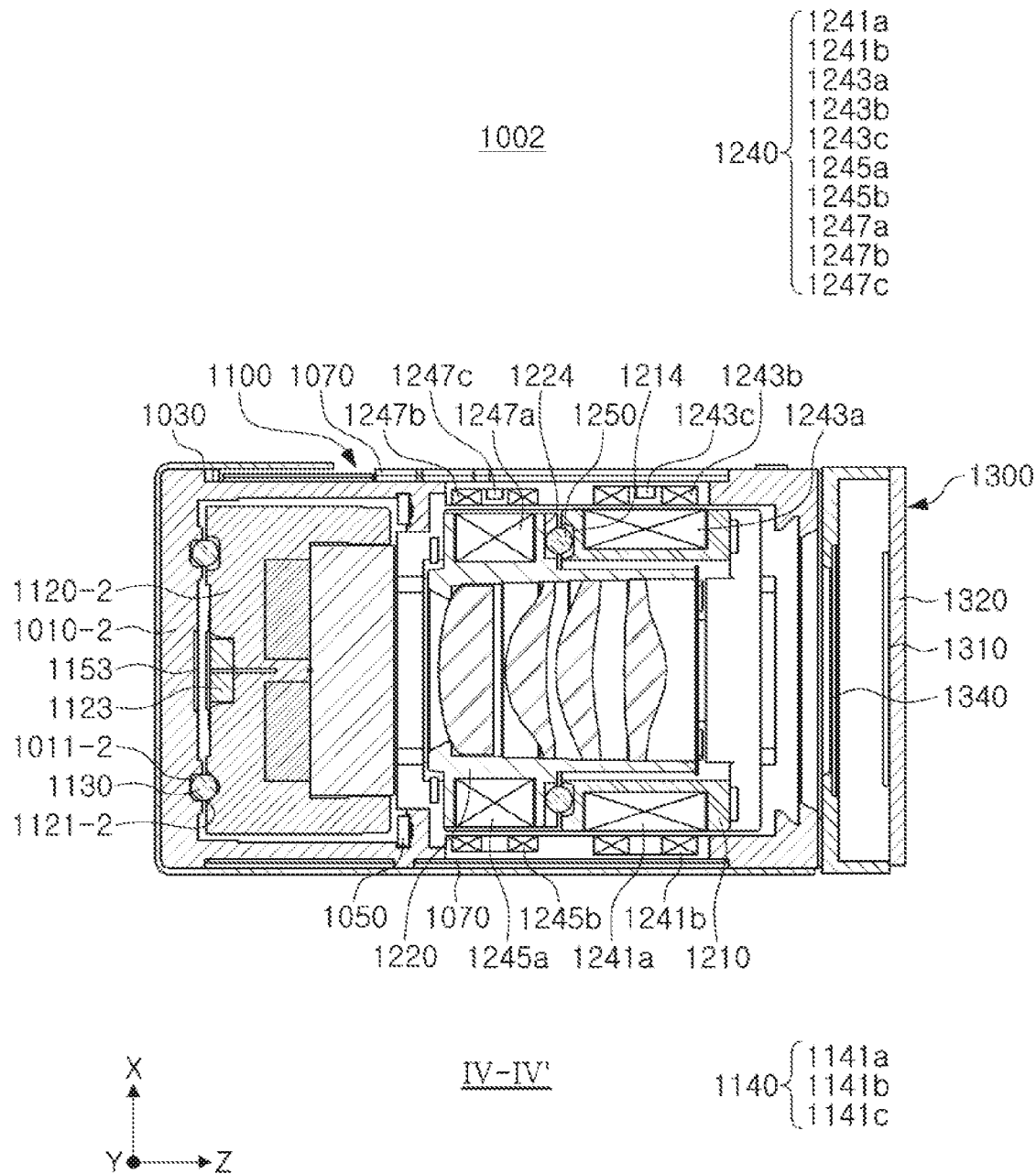
Figure 15:
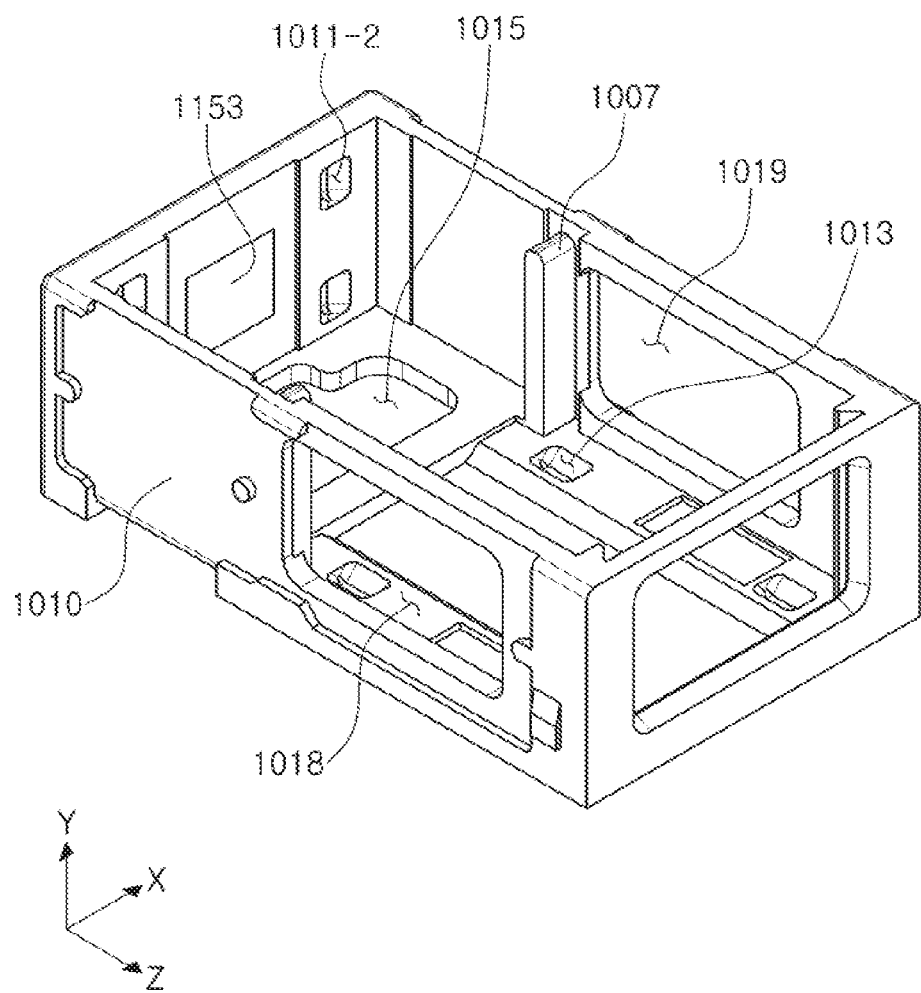
FIG. 15 is a perspective view of a housing of a camera module according to an embodiment.

FIG. 2 is a perspective view illustrating a camera module according to an embodiment, FIG. 3 is an exploded perspective view of a camera module according to an embodiment, FIG. 12 is a perspective view of a camera module according to an embodiment, and FIG. 13 is an exploded perspective view illustrating a camera module according to an embodiment.

Referring to FIGS. 2, 3, 12, and 13, a camera module 1001 or 1002 according to an embodiment includes a reflecting module 1100 or 1100-2, a lens module 1200, and an image sensor module 1300 provided in a housing 1010 or 1010-2.

The reflecting module 1100 or 1100-2 changes a direction of light. As an example, the direction of light incident through an opening 1031 of a cover 1030 covering an upper portion of the camera module 1001 or 1002 is changed through the reflecting module 1100 or 1100-2 so that the light is directed toward the lens module 1200. To this end, the reflecting module 1100 or 1100-2 may include a reflecting member 1110 reflecting the light.

A path of the light incident through the opening 1031 is changed by the reflecting module 1100 or 1100-2 so that the light is directed toward the lens module 1200. For example, a path of light incident in the thickness direction (the Y-axis direction) of the camera module 1001 or 1002 is changed by the reflecting module 1100 or 1100-2 to approximately coincide with the optical axis direction (a Z-axis direction).

The lens module 1200 may include lenses through which the light which direction has been changed by the reflecting module 1100 passes, and the image sensor module 1300 includes an image sensor 1310 converting the light passing through the lenses into an electrical signal and a printed circuit board 1320 on which the image sensor 1310 is mounted. In addition, the image sensor module 1300 may include an optical filter 1340 filtering the light incident from the lens module 1200 thereto. The optical filter 1340 may be an infrared cut-off filter.

In an internal space of the housing 1010 or 1010-2, the reflecting module 1100 or 1100-2 is provided in front of the lens module 1200 and the image sensor module 1300 is provided behind the lens module 1200.

Referring to FIGS. 2 through 9, the camera module 1001 according to an embodiment includes the reflecting module 1100, the lens module 1200, and the image sensor module 1300 provided in the housing 1010.

The reflecting module 1100, the lens module 1200, and the image sensor module 1300 are sequentially provided from one side of the housing 1010 to the other side thereof in the housing 1010. The housing 1010 has an internal space so that the reflecting module 1100, the lens module 1200, and the image sensor module 1300 are inserted thereinto.

The housing 1010 is integrally provided so that both of the reflecting module 1100 and the lens module 1200 are inserted into the internal space of the housing 1010. However, the housing 1010 is not limited thereto. For example, separate housings into which the reflecting module 1100 and the lens module 1200 are inserted, respectively, may also be connected to each other.

The printed circuit board 1320 included in the image sensor module 1300 is attached to an outer portion of the housing 1010.

The housing 1010 may be covered by the cover 1030 so that the internal space of the housing 1010 cannot be viewed.

The cover 1030 has the opening 1031 through which light is incident, and a direction of the light incident through the opening 1031 is changed by the reflecting module 1100, such that the light is incident to the lens module 1200. The cover 1030 may be integrally provided to cover the entire housing 1010, or may be provided as separate members each covering the reflecting module 1100 and the lens module 1200.

The reflecting module 1100 includes the reflecting member 1110 reflecting the light. In addition, the light incident to the lens module 1200 passes through the lenses and is then converted into and stored as an electrical signal by the image sensor 1310.

The housing 1010 includes the reflecting module 1100 and the lens module 1200 disposed in the internal space thereof. Therefore, in the internal space of the housing 1010, a space in which the reflecting module 1100 is disposed and a space in which the lens module 1200 is disposed are distinguished from each other by protruding walls 1007.

In addition, the reflecting module 1100 is disposed in front of the protruding walls 1007, and the lens module 1200 is disposed behind the protruding walls 1007. The protruding walls 1007 protrude from opposite sidewalls of the housing 1010 to the internal space.

The reflecting module 1100 disposed in front of the protruding walls 1007 has a structure in which a moving holder 1120 is closely adhered and supported by an inner wall surface of the housing 1010 by attractive force between a pulling yoke 1153 provided on the inner wall surface of the housing 1010 and a pulling magnet 1123 provided in the moving holder 1120.

Here, although not illustrated in the drawings, the housing 1010 may also be provided with a pulling magnet, and the moving holder 1120 may also be provided with a pulling yoke. However, a structure illustrated in the drawings will hereinafter be described for convenience of explanation.

In addition, first ball bearings 1130 are provided between the inner wall surface of the housing 1010 and the moving holder 1120. Since the first ball bearings 1130 are closely adhered to seating grooves 1011 and 1121 while being partially inserted into the seating grooves 1011 and 1121 as described below, when the moving holder 1120 is inserted into the internal space of the housing 1010, a slight space is required between the moving holder 1120 and the protruding walls 1007, and after the moving holder 1120 is mounted in the housing 1010, the moving holder 1120 is closely adhered to the inner wall surface of the housing 1010 by the attractive force between the pulling yoke and the pulling magnet, and a small space may thus remain between the moving holder 1120 and the protruding walls 1007.

Therefore, in an embodiment, the housing 1010 includes stoppers 1050 fitted onto the protruding walls 1007 while supporting the moving holder 1120 and having a hook shape (even though the stoppers 1050 are not provided, the moving holder is fixed to the housing by the attractive force between the pulling magnet 1123 and the pulling yoke 1153). The stoppers 1050 may have a hook shape, and support the moving holder 1120 in a state in which hook portions thereof are hooked onto the protruding walls 1007.

The stoppers 1050 serve as brackets supporting the moving holder 1120 when the reflecting module 1100 is not driven, and additionally serve as the stoppers 1050 adjusting movement of the moving holder 1120 when the reflecting module 1100 is driven. The stoppers 1050 are provided, respectively, on the protruding walls 1007 protruding from the opposite sidewalls of the housing.

A space is provided between the stoppers 1050 and the moving holder 1120 so that the moving holder 1120 is smoothly rotated. In addition, the stoppers 1050 may be formed of an elastic material to allow the moving holder 1120 to be smoothly moved in a state in which the moving holder 1120 is supported by the stoppers 1050.

In addition, the housing 1010 includes a first driving part 1140 and a second driving part 1240 each provided in order to drive the reflecting module 1100 and the lens module 1200. The first driving part 1140 includes coils 1141b for driving the reflecting module 1100, and the second driving part 1240 includes coils 1241b, 1243b, 1245b, and 1247b for driving the lens module 1200.

In addition, the coils 1141b, 1241b, 1243b, 1245b, and 1247b are provided in the housing 1010 in a state in which they are mounted on a main board 1070, and the housing 1010 is thus provided with through-holes 1015, 1018, and 1019 so that the coils 1141b, 1241 b, 1243b, 1245b, and 1247b are exposed to the internal space of the housing 1010 (an example in which the through-holes 1018 and 1019 for the coils 1241b, 1243b, 1245b, and 1247b of the second driving part 1240 are provided for the coils is illustrated, but the through-holes are not limited thereto. That is, each of the coils may also be exposed to the internal space of the housing 1010 through one through-hole).

Here, the main board 1070 on which the coils 1141b, 1241b, 1243b, 1245b, and 1247b are mounted may be entirely connected and integrally provided, as illustrated in the drawings. In this case, one terminal is provided, and connection of an external power supply and signals is thus easy. However, the main board 1700 is not limited thereto, but may also be provided as a plurality of boards by separating a board on which coils for the reflecting module 1100 are mounted and a board on which coils for the lens module 1200 are mounted from each other.

The reflecting module 1100 changes the path of the light incident thereto through the opening 1031. When an image or a moving picture is captured, the image may be blurred or the moving picture may be shaken due to hand-shake, or the like, of a user. In this case, the reflecting module 1100 corrects a displacement in one direction depending on the hand-shake, or the like, of the user by moving the moving holder 1120 on which the reflecting member 1110 is mounted. For example, when shaking is generated at the time of capturing the image or the moving picture due to the hand-shake, or the like, of the user, a relative displacement corresponding to the shake may be provided to the moving holder 1120 to compensate for the shaking. In the present exemplary embodiment, the reflecting module 1100 performs the OIS function by moving the reflecting member 1110 in any direction generally perpendicular to the optical axis direction (the Z-axis direction) (the reflecting member 1110 may be moved in a second axis direction (the Y-axis direction in the drawings) (as described below, movement in a first axis direction (an X-axis direction) is implemented by moving a lens barrel 1220 provided in the lens module 1200 in the first axis direction (the X-axis direction) with respect to a carrier 1210).

In addition, in an embodiment, the OIS function may be partially implemented by the movement of the moving holder 1120 having a relatively low weight due to absence of lenses, and the like, and power consumption may thus be significantly reduced.

That is, in an embodiment, in order to implement the OIS function, the movement of the lens barrel 1220 including lenses may be in charge of OIS (OIS X) in one direction (the lens barrel 1220 may be moved in the X-axis direction), and the movement of the moving holder 1120 on which the reflecting member 1110 is provided may be in charge of OIS (OIS Y) in another direction (the reflecting member 1110 may be moved in the Y-axis direction). The reflecting member 1110 changes a direction of the light (OIS Y), and the lens barrel 1220 moves so that a position of the lens barrel 1220 to which the light is incident is approximately parallel to the optical axis (the Z axis) (OIS X).

The reflecting module 1100 includes the moving holder 1120 provided in the housing 1010 to be supported by the housing 1010, the reflecting member 1110 mounted on the moving holder 1120, and the first driving part 1140 moving the moving holder 1120.

The reflecting member 1110 changes the direction of the light to the second axis direction (the Y-axis direction). For example, the reflecting member 1110 may be a mirror or a prism reflecting the light (a case in which the reflecting member 1110 is a prism is illustrated in the drawings associated with an embodiment for convenience of explanation).

The reflecting member 1110 is fixed to the moving holder 1120. The moving holder 1120 has a mounting surface on which the reflecting member 1110 is mounted.

The mounting surface 1122 of the moving holder 1120 is an inclined surface so that the path of the light is changed. For example, the mounting surface 1122 is an inclined surface inclined with respect to the optical axis (the Z axis) of each of the lenses by 30 to 60°. In addition, the inclined surface of the moving holder 1120 is directed toward the opening 1031 of the cover 1030 through which the light is incident.

The moving holder 1120 on which the reflecting member 1110 is mounted is accommodated in the internal space of the housing 1010 so that the reflecting member 1110 is movable in the second axis direction (the Y-axis direction). For example, the moving holder 1120 is accommodated in the housing 1010 to be rotatable generally around a first axis (an X axis). Here, the first axis (the X axis) and a second axis (a Y axis) refer to axes perpendicular to the optical axis (the Z axis), and are generally perpendicular to each other.

The moving holder 1120 is supported by the housing 1010 by the first ball bearings 1130 aligned on the first axis (the X axis) so that the reflecting member 1110 is moved in the second axis direction (the Y-axis direction). The moving holder 1120 may be rotated around the first axis (the X axis) in such a configuration.

In the drawings, two first ball bearings 1130 aligned on the first axis (the X axis) are shown. In addition, the moving holder 1120 may be rotated around the first axis (the X axis) by a first driving part 1140 to be described below.

Here, a plurality of first ball bearings 1130 aligned on the first axis (the X axis) are provided in a spherical shape, a hemispherical shape, or a rounded protrusion shape. In addition, the plurality of first ball bearings 1130 aligned on the first axis (the X axis) are provided in a cylindrical shape, a semi-cylindrical shape, or a rounded protrusion shape extended on the first axis (the X axis).

Figure 8A:
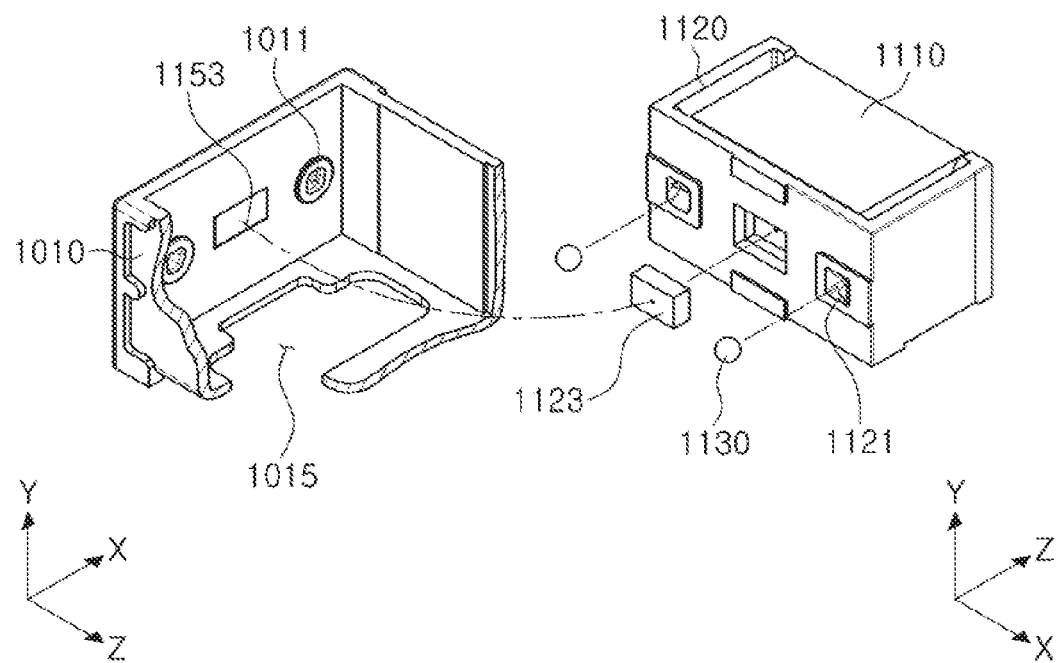
FIGS. 8A and 8B are exploded perspective views of a housing and a moving holder in the camera module according to an embodiment.
Figure 8B:
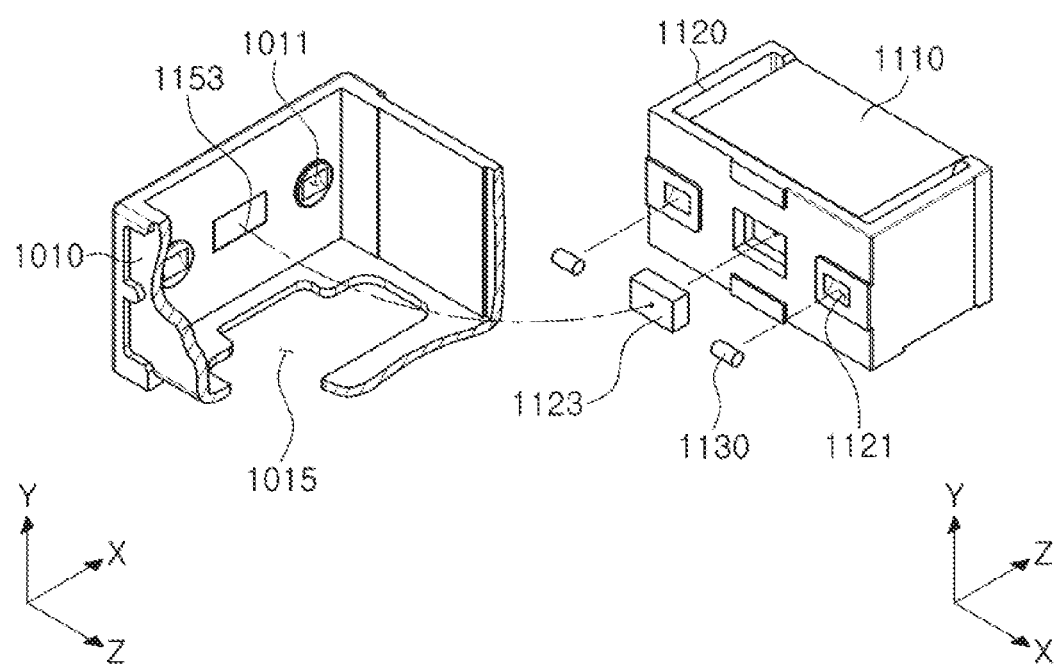
Figure 9:
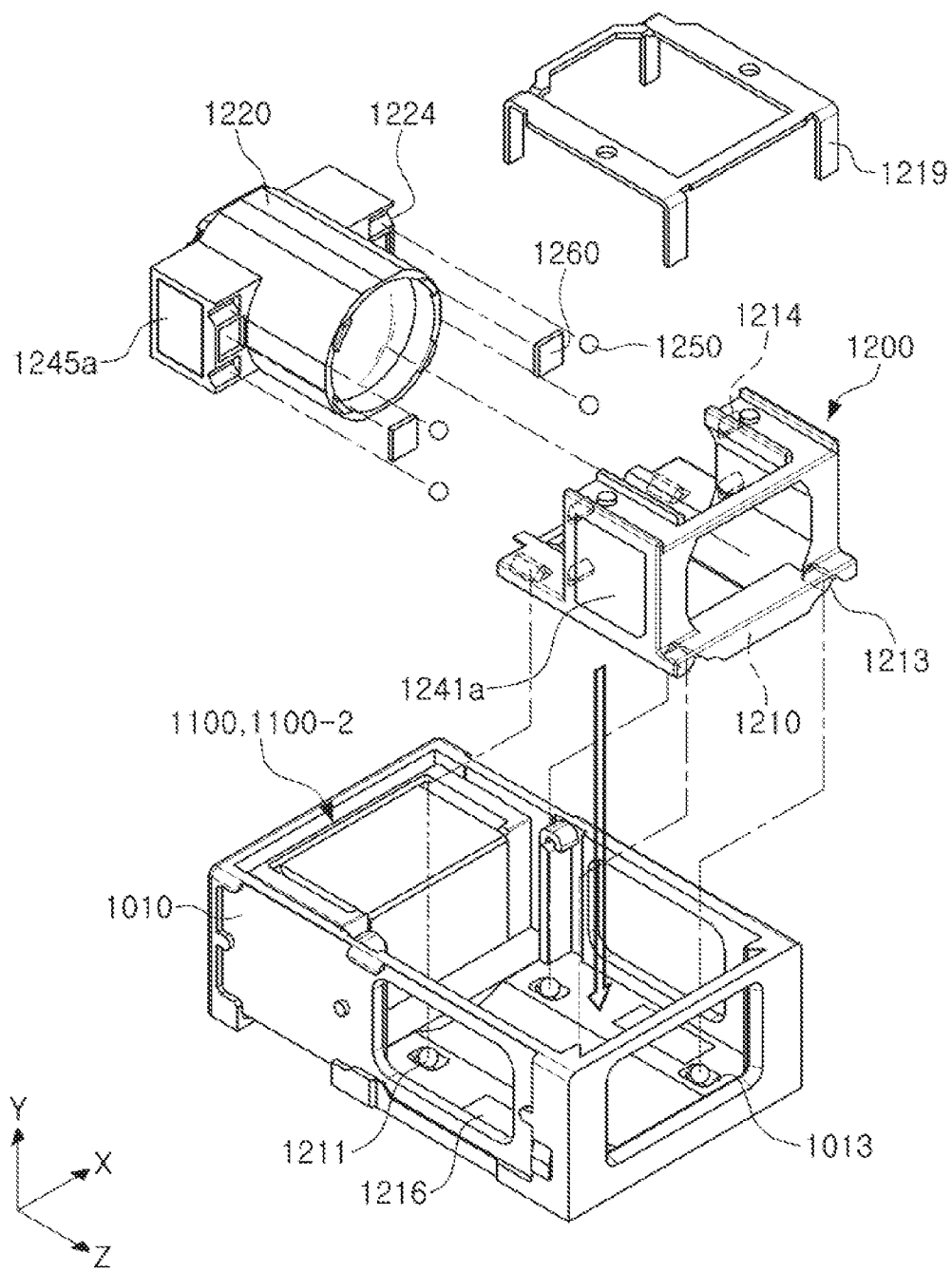
FIG. 9 is an exploded view showing a shape in which the reflection module and the lens module are coupled to the housing of the camera module according to embodiments.

In each case, the seating grooves 1011 and 1121 are provided in shapes corresponding to that of the first ball bearings (see FIGS. 8A and 8B). Meanwhile, a case in which two first ball bearings 1130 are provided is illustrated in FIG. 8B, but one or two or more first ball bearings 1130 extended to be elongate in the first axis direction (the X-axis direction) may also be provided.

In addition, the first ball bearings 1130 are provided between facing surfaces of the moving holder 1120 and the housing 1010. In addition, the moving holder 1120 is supported by the housing 1010 with the first ball bearings 1130 interposed therebetween by the attractive force between the pulling magnet 1123 or the pulling yoke provided in the moving holder 1120 and the pulling yoke 1153 or the pulling magnet provided in the housing 1010.

In addition, the housing 1010 is provided with the seating grooves 1011 into which the first ball bearings 1130 are partially inserted, and the moving holder 1120 is also provided with the seating grooves 1121 into which the first ball bearings 1130 are partially inserted.

The seating grooves 1011 and 1121 described above may be provided in hemispherical or polygonal (poly-prismatic or poly-pyramidal) groove shapes so that the first ball bearings 1130 are easily rotated (depths of the seating grooves 1011 and 1121 may be smaller than radii thereof in order for the first ball bearings 1130 to be easily rotated. The first ball bearings 1130 do not entirely enter the seating grooves, but may be partially exposed, such that the moving holder 1120 may be easily rotated). In addition, positions and the numbers of seating grooves 1011 and 1121 correspond to those of the first ball bearings 1130 aligned on the first axis (the X axis).

Here, the first ball bearings 1130 serve as bearings while being rolled and slid in the seating grooves 1011 and 1121.

Meanwhile, the first ball bearings 1130 have a structure in which they are fixedly provided in one or both of the housing 1010 and the moving holder 1120. For example, the first ball bearings 1130 may be fixedly provided in the housing 1010 or the moving holder 1120. In this example, only a member facing a member in which the first ball bearings 1130 are fixedly provided are provided with the seating grooves. In this case, the first ball bearings 1130 serve as friction bearings by sliding of the first ball bearings rather than rotation of the first ball bearings.

When the first ball bearings 1130 have the structure in which they are fixedly provided in any one of the housing 1010 and the moving holder 1120, the first ball bearings 1130 may be provided in a spherical or hemispherical shape (a case in which the first ball bearings are provided in the hemispherical shape is an example, and the first ball bearings may also have a protrusion length greater or smaller than a hemisphere). As described above, a case in which the first ball bearings 1130 are provided in the cylindrical shape extended on the first axis (the X axis) may also be similarly applied.

In addition, the first ball bearings 1130 may be separately manufactured and be then attached to any one of the housing 1010 and the moving holder 1120. Alternatively, the first ball bearings 1130 may be provided integrally with the housing 1010 or the moving holder 1120 at the time of manufacturing the housing 1010 and the moving holder 1120.

The first driving part 1140 may generate driving force so that the moving holder 1120 is rotatable around the first axis (the X axis).

As an example, the first driving part 1140 includes a magnet 1141*a* and a coil 1141*b* disposed to face the magnet 1141*a* (a case in which one magnet and one coil are disposed to face each other is illustrated in the drawings, but the magnet and the coil are not limited thereto. That is, magnets and coils may be provided. In addition, a case in which the magnet and the coil are provided on bottom surfaces of the moving holder 1120 and the housing 1010, respectively, is illustrated in the drawings, but the magnet and the coil may also be provided on side surfaces of the moving holder 1120 and the housing 1010, respectively).

When power is applied to the coil 1141*b*, the moving holder 1120 in which the magnet 1141*a* is mounted rotates generally around the first axis (the X axis) by electromagnetic interaction between the magnet 1141*a* and the coil 1141*b*.

The magnet 1141*a* is mounted in the moving holder 1120. As an example, the magnet 1141*a* is mounted on a lower surface of the moving holder 1120.

The coil 1141*b* is mounted in the housing 1010. As an example, the coil 1141*b* may be mounted in the housing 1010 through the main board 1070. That is, the coil 1141b may be provided on the main board 1070, and the main board 1070 may be mounted in the housing 1010.

An example in which the main board 1070 is entirely integrally provided so that both of the coils for the reflecting module 1100 and the coils for the lens module 1200 are mounted thereon is shown in the drawings, the main board 1070 may be provided as two or more separate boards on which the coils for the reflecting module 1100 and the coils for the lens module 1200 are mounted, respectively.

A reinforcing plate (not illustrated) may be mounted beneath the main board 1070 in order to reinforce the strength of the main board.

In an embodiment, when the moving holder 1120 is rotated, a closed loop control manner of sensing and feeding back a position of the moving holder 1120 is used.

Therefore, a position sensor 1141c may be required in order to perform a closed loop control. The position sensor 1141c may be a hall sensor.

The position sensor 1141c is disposed inside or outside the coil 1141b, and may be mounted on the main board 1070 on which the coil 1141b is mounted.

Meanwhile, the main board 1070 may be provided with a gyro sensor (not illustrated) sensing a shake factor such as the hand-shake of the user, and may be provided with a driver integrated circuit (IC) (not illustrated) providing a driving signal to the coil 1141b.

The light reflected from the reflecting module 1100 is incident to the lens module 1200. In addition, the OIS (OIS X) in one direction for the incident light is performed by the movement of the lens barrel 1220 provided in the lens module 1200. That is, as described above, the reflecting module 1100 performs OIS (OIS Y) in the second axis direction (the Y-axis direction) by moving the reflecting member 1110 in the second axis direction (the Y-axis direction), and the lens module 1200 performs OIS (OIS X) in the first axis direction (the X-axis direction) by moving the lens barrel 1220 in the first axis direction (the X-axis direction). The first axis (the X axis) is approximately perpendicular to the optical axis (the Z axis), and the second axis (the Y axis) is approximately perpendicular to the first axis (the X axis) and the optical axis (the Z axis).

Optical axes of the stacked lenses provided in the lens module 1200 are aligned in the Z-axis direction, a direction in which the light is emitted from the reflecting module 1100. In addition, the lens module 1200 includes the second driving part 1240 in order to implement an OIS function, an AF function, a zoom function in the first axis direction (the X-axis direction).

The lens module 1200 includes the carrier 1210 provided in the internal space of the housing 1010 to be movable in the optical axis direction (the Z-axis direction), the lens barrel 1220 provided on the carrier 1210 to be movable in the first axis direction (the X-axis direction) and including the lenses stacked therein, and the second driving part 1240 moving the carrier 1210 in the optical axis direction (the Z-axis direction) with respect to the housing 1010 (also moving the lens barrel 1220) or moving the lens barrel 1220 in the first axis direction (the X-axis direction) with respect to the carrier 1210.

In addition, a stopper 1219 that prevents separation of the lens barrel 1220 put on the carrier 1210 and limits the movement of the lens barrel 1220 is provided on the carrier 1210.

The light which direction has been changed into the second axis direction (the Y-axis direction) by the reflecting module 1100 is refracted while passing through the lenses.

The carrier 1210 is configured to be moved in the optical axis direction (the Z-axis direction) for the purpose of auto-focusing (AF) (the lens barrel 1220 on the carrier 1210 may be also moved). As an example, the carrier 1210 is configured to be movable in a direction (including an opposite direction to the direction) in which the light which direction has been changed into the second axis direction (the Y-axis direction) by the reflecting module 1100 passes through the lenses.

In addition, the lens barrel 1220 may be moved in the first axis direction (the X-axis direction) approximately perpendicular to the second axis (the Y axis) and the optical axis (the Z axis) for the purpose of the OIS in the first axis direction (the X-axis direction).

Therefore, the second driving part 1240 generates driving force so that the carrier 1210 is movable in the optical axis direction (the Z-axis direction) and the lens barrel 1220 is movable in the first axis direction (the X-axis direction). That is, the second driving part 1240 may move the lens barrel 1220 to change a distance between the lens barrel 1220 and the reflecting module 1100, or the lens barrel 1220 may be moved in the first axis direction (the X-axis direction) to allow the OIS in the first axis direction (the X-axis direction) to be performed.

As an example, the second driving part 1240 includes magnets 1241a, 1243a, 1245a, and 1247a and coils 1241b, 1243b, 1245b, and 1247b disposed to face the magnets 1241a, 1243a, 1245a, and 1247a.

When power is applied to the coils 1241b, 1243b, 1245b, and 1247b, the carrier 1210 in which the magnets 1241a, 1243a, 1245a, and 1247a are mounted is moved in the optical axis direction (the Z-axis direction) or the lens barrel 1220 is moved in the first axis direction (the X-axis direction), by electromagnetic interaction between the magnets 1241a, 1243a, 1245a, and 1247a and the coils 1241b, 1243b, 1245b, and 1247b.

Some 1241a and 1243a of the magnets 1241a, 1243a, 1245a, and 1247a are mounted in the carrier 1210. As an example, some magnets 1241a and 1243a are mounted on side surfaces of the carrier 1210. In addition, the other magnets 1245a and 1247a are mounted in the lens barrel 1220. As an example, the other magnets 1245a and 1247a are mounted on side surfaces of the lens barrel 1220.

Some of 1241b and 1243b of the coils 1241b, 1243b, 1245b, and 1247b are mounted in the housing 1010 to face some 1241a and 1243a of the magnets. In addition, the other coils 1245b and 1247b are mounted in the housing 1010 to face the other magnets 1245a and 1247a.

As an example, the main board 1070 is mounted in the housing 1010 in a state in which the coils 1241b, 1243b, 1245b, and 1247b are mounted on the main board 1070. Here, an example in which both of the coils for the reflecting module 1100 and the coils for the lens module 1200 are mounted on the main board 1070 is illustrated in the drawings for convenience of explanation, the main board 1070 is not limited thereto, but may be also provided as separate boards on which the coils for the reflecting module 1100 and the coils for the lens module 1200 are mounted, respectively.

In an embodiment, when the carrier 1210 and the lens barrel 1220 are moved, a closed loop control manner of sensing and feeding back positions of the carrier 1210 and the lens barrel 1220 is used. Therefore, position sensors 1243c and 1247c may be required in order to perform a closed loop control. The position sensors 1243c and 1247c may be hall sensors.

The position sensors 1243c and 1247c may be disposed inside or outside of the coils 1243b and 1247b, respectively, and may be mounted on the main board 1070 on which the coils 1243b and 1247b are mounted.

The carrier 1210 is provided in the housing 1010 to be movable in the optical axis direction (the Z-axis direction). As an example, ball members 1211 are disposed between the carrier 1210 and the housing 1010.

The ball members 1211 serve as bearings guiding the movement of the carrier 1210 in an AF process. In addition, the members 1211 serve to maintain an interval between the carrier 1210 and the housing 1010.

The ball members 1211 are rolled in the optical axis direction (the Z-axis direction) when driving force in the optical axis direction (the Z-axis direction) is generated. Therefore, the ball members 1211 guide the movement of the carrier 1210 in the optical axis direction (the Z-axis direction).

Guide grooves 1213 and 1013 accommodating the ball members 1211 therein are formed in facing surfaces of the carrier 1210 and the housing 1010, respectively, and some of the guide grooves 1213 and 1013 are provided to be elongate in the optical axis direction (the Z-axis direction).

The ball members 1211 are accommodated in the guide grooves 1213 and 1013 and are fitted between the carrier 1210 and the housing 1010.

The ball members 1211 may be limited from being moved in the first axis direction (the X-axis direction) and the second axis direction (the Y-axis direction) and may be moved in only the optical axis direction (the Z-axis direction), in a state in which they are accommodated in the guide grooves 1213 and 1013.

Each of the guide grooves 1213 and 1013 are formed to be elongate in the optical axis direction (the Z-axis direction). In addition, cross sections of the guide grooves 1213 and 1013 may have various shapes such as a round shape, a polygonal shape, and the like.

Here, the carrier 1210 is pressed toward the housing 1010 so that the ball members 1211 are maintained in a state in which they are in contact with the carrier 1210 and the housing 1010.

The housing 1010 is provided with yokes 1216 facing the magnets 1241a and 1243a mounted in the carrier 1210. The yokes 1216 are formed of a magnetic material.

Attractive force acts between the yokes 1216 and the magnets 1241a and 1243a. Therefore, the carrier 1210 is moved in the optical axis direction (the Z-axis direction) by the driving force of the second driving part 1240 in a state in which it is in contact with the ball members 1211.

The lens barrel 1220 is provided on the carrier 1210 to be movable in the first axis direction (the X-axis direction). As an example, second ball bearings 1250 are provided between the lens barrel 1220 and the carrier 1210, and the lens barrel 1220 may be slid or rolled with respect to the carrier 1210 by the second ball bearings 1250.

The second ball bearings 1250 serve as bearings guiding the movement of the lens barrel 1220 in an OIS process in the first axis direction (the X-axis direction).

The second ball bearings 1250 are rolled or slid in the first axis direction (the X-axis direction) when driving force in the first axis direction (the X-axis direction) is generated.

Guide grooves 1224 and 1214 accommodating the second ball bearings 1250 therein are formed in facing surfaces of the lens barrel 1220 and the carrier 1210, respectively, and some of the guide grooves are provided to be elongate in the first axis direction (the X-axis direction).

The second ball bearings 1250 are accommodated in the guide grooves 1224 and 1214 and are fitted between the lens barrel 1220 and the carrier 1210.

The second ball bearings 1250 may be limited from being moved in the optical axis direction (the Z-axis direction) and the second axis direction (the Y-axis direction) and may be moved in only the first axis direction (the X-axis direction), in a state in which they are accommodated in the guide grooves 1224 and 1214.

Each of the guide grooves 1224 and 1214 are formed to be elongate in the first axis direction (the X-axis direction). In addition, cross sections of the guide grooves 1224 and 1214 may have various shapes such as a round shape, a polygonal shape, and the like.

Here, the lens barrel 1220 is pressed toward the carrier 1210 so that the plurality of second ball bearings 1250 are maintained in a state in which they are in contact with the lens barrel 1220 and the carrier 1210. That is, the lens barrel 1220 is pressed toward the carrier 1210 in a direction in which the second ball bearings 1250 are provided.

The lens barrel 1220 is provided with yokes 1260 facing the magnets 1241a and 1243a mounted in the carrier 1210. The yokes 1260 may be formed of a magnetic material.

Attractive force acts between the yokes 1260 and the magnets 1241a and 1243a. Therefore, the lens barrel 1220 is moved in the first axis direction (the X-axis direction) by the driving force of the second driving part 1240 in a state in which it is in contact with the ball bearings 1250.

Figure 10A:
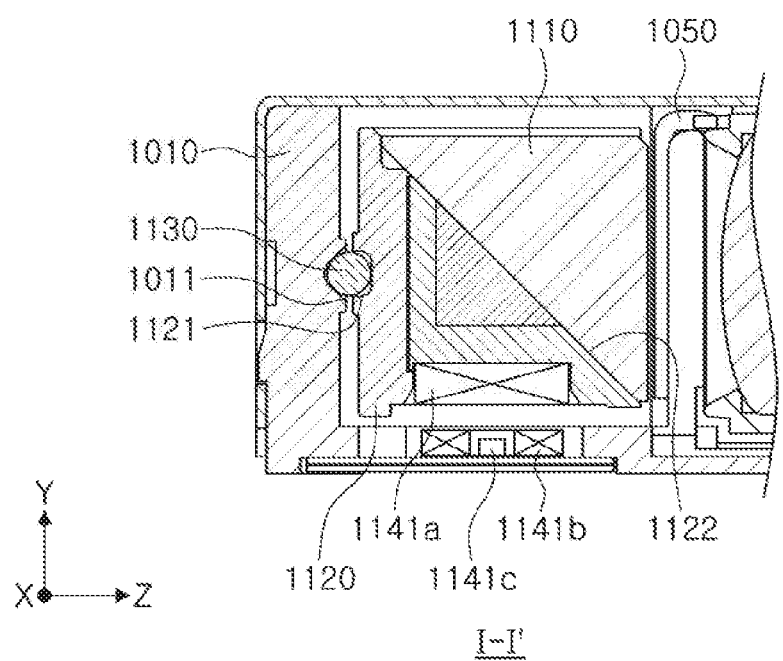
FIGS. 10A through 10C are schematic views showing an example in which the moving holder according to an embodiment is rotated around a first axis (an X axis.
Figure 10B:
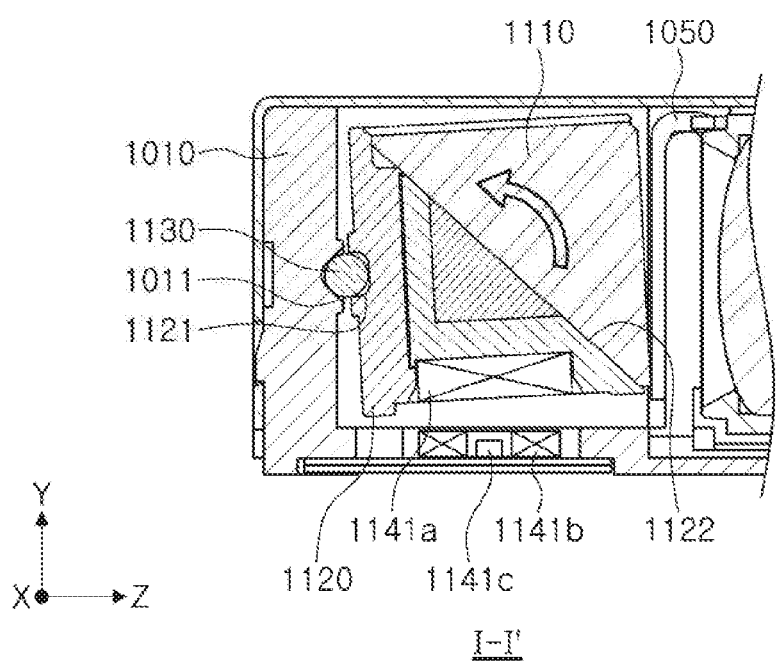
Figure 10C:
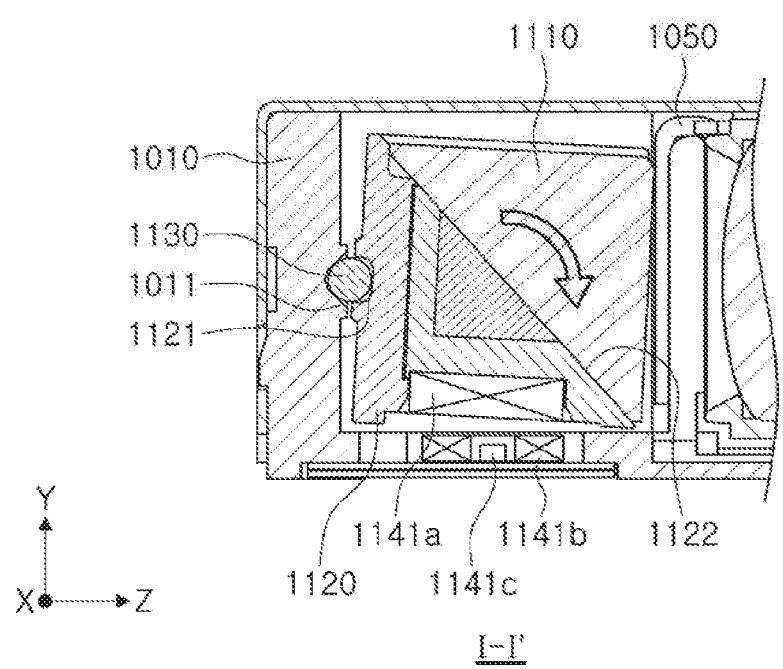

FIGS. 10A through 10C are schematic views illustrating an example in which the moving holder according to an embodiment is rotated generally around a first axis (an X axis).

Referring to FIGS. 10A through 10C, when the moving holder 1120 is rotated around the first axis (the X axis) in order to perform the OIS (OIS Y) in the second axis direction (the Y-axis direction), the moving holder 1120 is rotated around the first ball bearings 1130 provided between the moving holder 1120 and the housing 1010 and arranged along the first axis (the X axis).

Figure 11A:
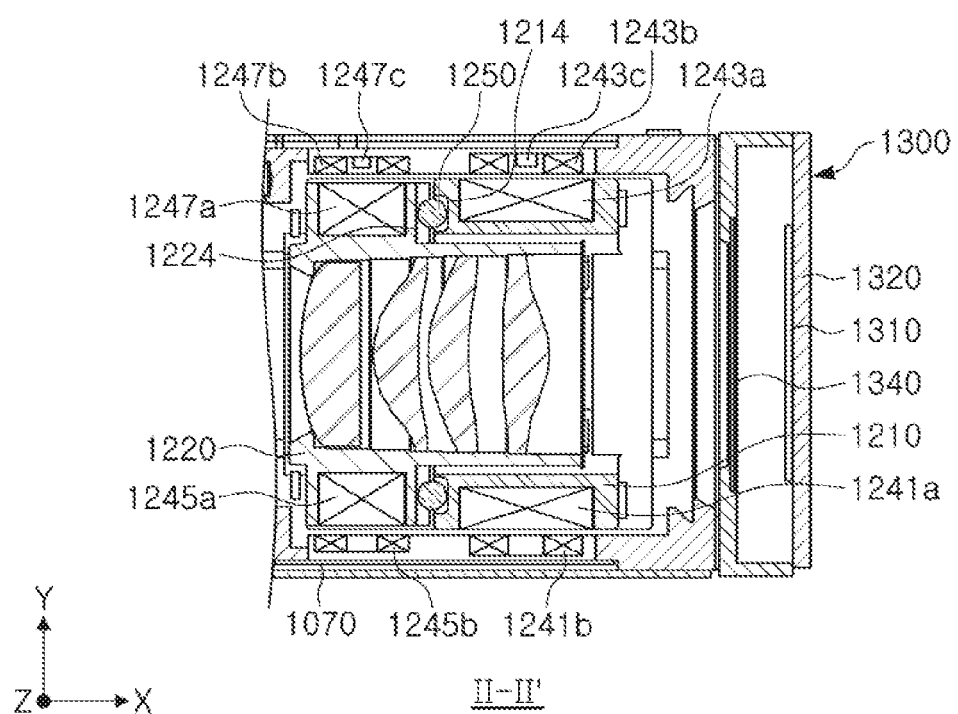
FIGS. 11A through 11C are schematic views of an example in which a lens barrel according to embodiments are moved linearly along the first axis (the X axis) on a carrier.
Figure 11B:
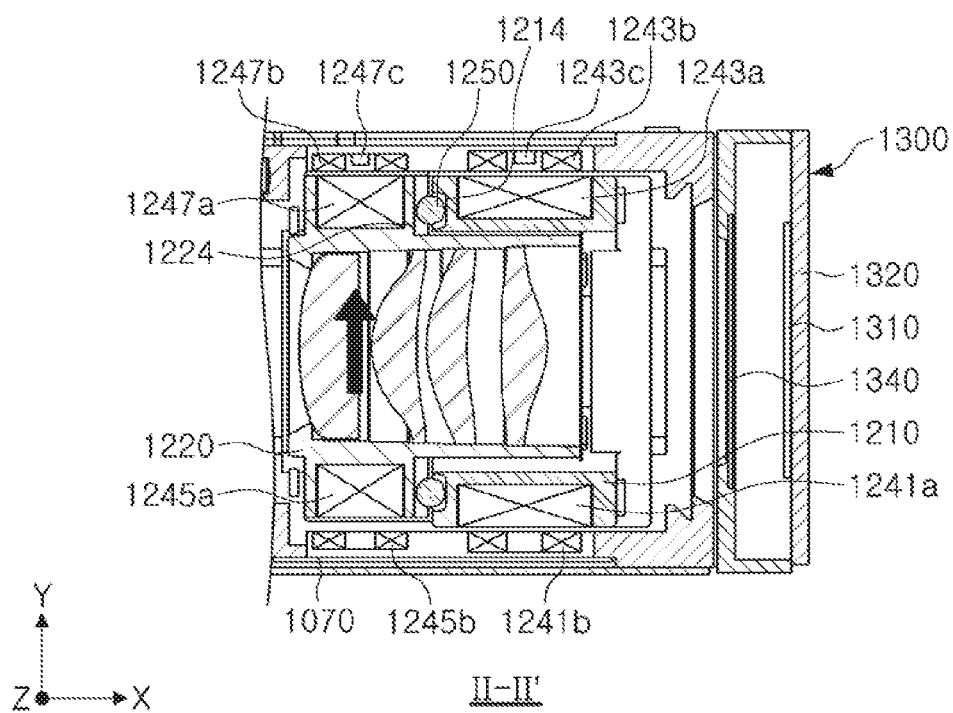
Figure 11C:
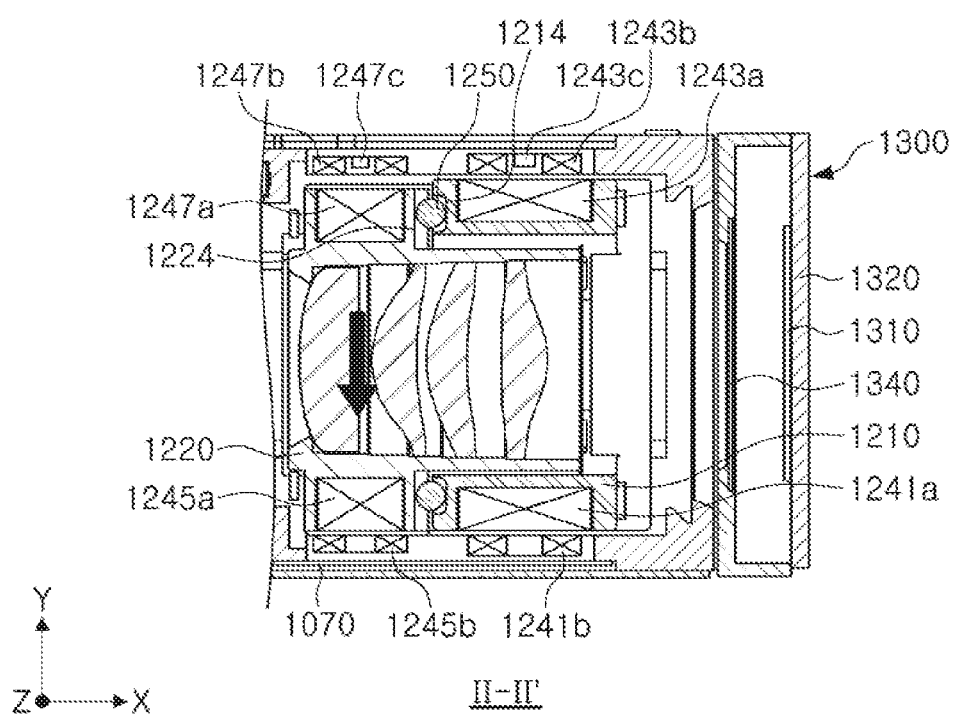

FIGS. 11A through 11C are schematic views illustrating an example in which a lens barrel according to an embodiment is moved linearly along the first axis (the X axis) on a carrier.

Referring to FIGS. 11A through 11C, when the lens barrel 1220 is moved linearly along the first axis (the X axis) in order to perform the OIS (OIS X) in the first axis direction (the X-axis direction), the lens barrel 1220 is moved linearly in the first axis direction (the X-axis direction) on the basis of the second ball bearings 1250 provided as at least two sets 1250a and 1250b between the carrier 1210 and the lens barrel 1220 and arranged in the first axis (the X axis).

That is, in the camera module 1001 according to an embodiment, the lens barrel 1220 provided in the lens module 1200 is moved linearly in the first axis direction (the X-axis direction) with respect to the carrier 1210 in order to perform the OIS (OIS X) in the X-axis direction, and the moving holder 1120 provided in the reflecting module 1100 is rotated around the first axis (the X axis) with respect to the housing 1010 in order to perform the OIS (OIS Y) in the Y-axis direction.

Referring to FIGS. 13 through 16, 5, 7, 9, and 11A through 11C, the camera module 1002 according to an embodiment includes the reflecting module 1100-2, the lens module 1200, and the image sensor module 1300 provided in the housing 1010-2.

Since all the components of the camera module 1002 according to this embodiment except for a structure of the reflecting module 1100-2 and a structure in which the reflecting module 1100-2 is coupled to the housing 1010-2 are the same as those of the camera module 1001 according to previous embodiments (structures in which the lens module 1200 and the image sensor module 1300 of the camera module 1002 according to an embodiment are coupled to the housing are the same as those previously described), the same components will be denoted by the same reference numerals.

Referring to FIGS. 13 through 16, 5, 7, and 9, the camera module 1002 according to an embodiment includes the reflecting module 1100-2, the lens module 1200, and the image sensor module 1300 provided in the housing 1010-2.

The reflecting module 1100-2 provided in front of the protruding walls 1007 has a structure in which a moving holder 1120-2 is closely adhered and supported by an inner wall surface of the housing 1010-2 by attractive force between a pulling yoke 1153 provided on the inner wall surface of the housing 1010-2 and a pulling magnet 1123 provided in the moving holder 1120-2.

In addition, third ball bearings 1130-2 are provided between the inner wall surface of the housing 1010-2 and the moving holder 1120-2, and are closely adhered to seating grooves 1011-2 and 1121-2 while being partially inserted into the seating grooves 1011-2 and 1121-2, as described below.

The reflecting module 1100-2 changes the path of the light incident thereto through the opening 1031. When an image or a moving picture is captured, the image may be blurred or the moving picture may be shaken due to hand-shake, or the like, of a user. In this case, the reflecting module 1100-2 may correct a displacement in one direction depending on the hand-shake of the user by moving the moving holder 1120-2 on which the reflecting member 1110 is mounted. In an embodiment, the reflecting module 1100-2 performs the OIS function by moving the reflecting member 1110 in any one of directions perpendicular to the optical axis direction (the Z-axis direction) (the reflecting member 1110 may be moved in the second axis direction (the Y-axis direction in the drawings) (as described below, movement in a first axis direction (an X-axis direction) may be implemented by moving a lens barrel 1220 provided in the lens barrel 1200 in the first axis direction (the X-axis direction) with respect to a carrier 1210).

In an embodiment, in order to implement the OIS function, the movement of the lens barrel 1220 including lenses is in charge of OIS (OIS X) in one direction (the lens barrel 1220 is moved in the X-axis direction), and the movement of the moving holder 1120-2 on which the reflecting member 1110 is provided is in charge of OIS (OIS Y) in another direction (the reflecting member 1110 is moved in the Y-axis direction).

The reflecting module 1100-2 includes the moving holder 1120-2 provided in the housing 1010-2 to be supported by the housing 1010-2, the reflecting member 1110 mounted on the moving holder 1020-2, and the first driving part 1140 moving the moving holder 1120-2. The reflecting member 1110 changes the direction of the light into the second axis direction (the Y-axis direction).

The moving holder 1120-2 on which the reflecting member 1110 is mounted is accommodated in the internal space of the housing 1010-2 so that the reflecting member 1110 is movable in the second axis direction (the Y-axis direction). For example, the moving holder 1120-2 is accommodated in the housing 1010-2 to be linearly movable in the second axis direction (the Y-axis direction).

The moving holder 1120-2 is supported by the housing 1010-2 by two or more ball bearing sets 1130a and 1130b aligned on the second axis (the Y axis) to be moved linearly in the second axis direction (the Y-axis direction).

Two sets 1130a and 1130b of third ball bearings 1130-2 aligned on the second axis (the Y axis) and configured in pairs are illustrated by way of example in the drawings. Since the moving holder 1120-2 is moved along the second axis (the Y axis) in a state in which it is supported by the housing 1010-2, two or more sets 1130a and 1130b of third ball bearings 1130-2 need to be disposed parallel to the second axis direction (the Y axis direction) and be spaced apart from each other in the first axis direction (the X-axis direction) in order to stably move the moving holder 1120-2. In this case, any one of the two sets 1130a and 1130b may also include only one third ball bearing 1130-2.

Here, the third ball bearings 1130-2 aligned on the second axis (the Y axis) may be provided in a spherical shape, a hemispherical shape, or a rounded protrusion shape. In addition, the plurality of third ball bearings 1130-2 aligned on the second axis (the Y axis) may be provided in a cylindrical shape, a semi-cylindrical shape, or a rounded protrusion shape extended on the second axis (the Y axis).

Figure 16A:
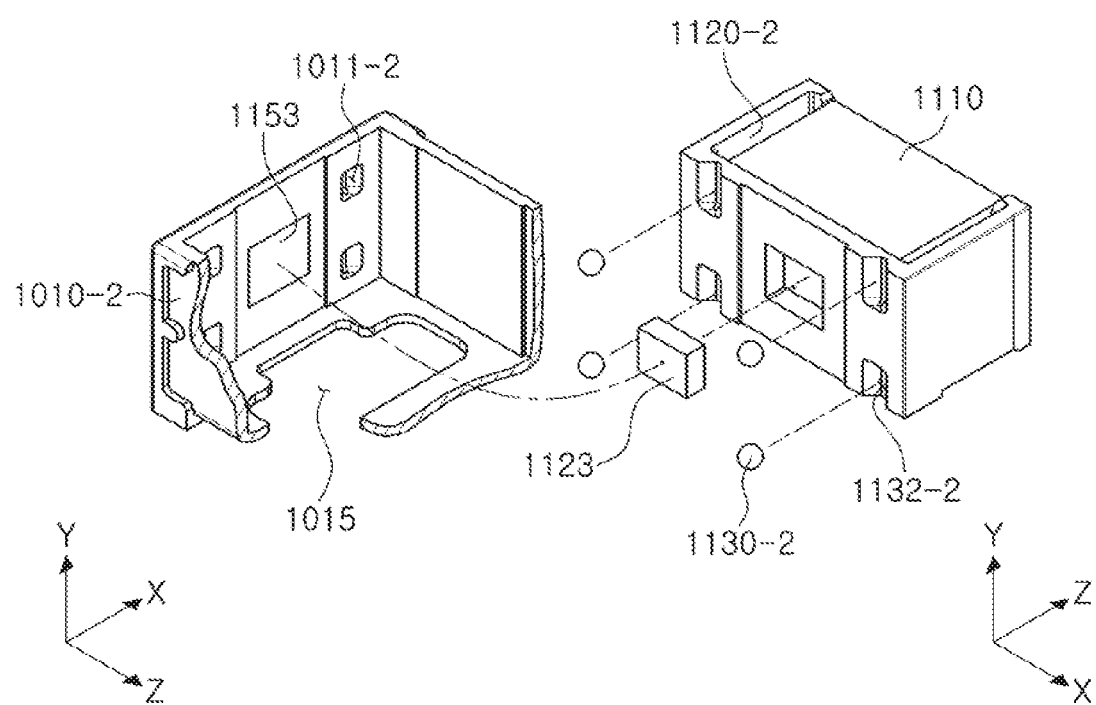
FIGS. 16A and 16B are exploded perspective views of a housing and a moving holder in the camera module according to an embodiment.
Figure 16B:
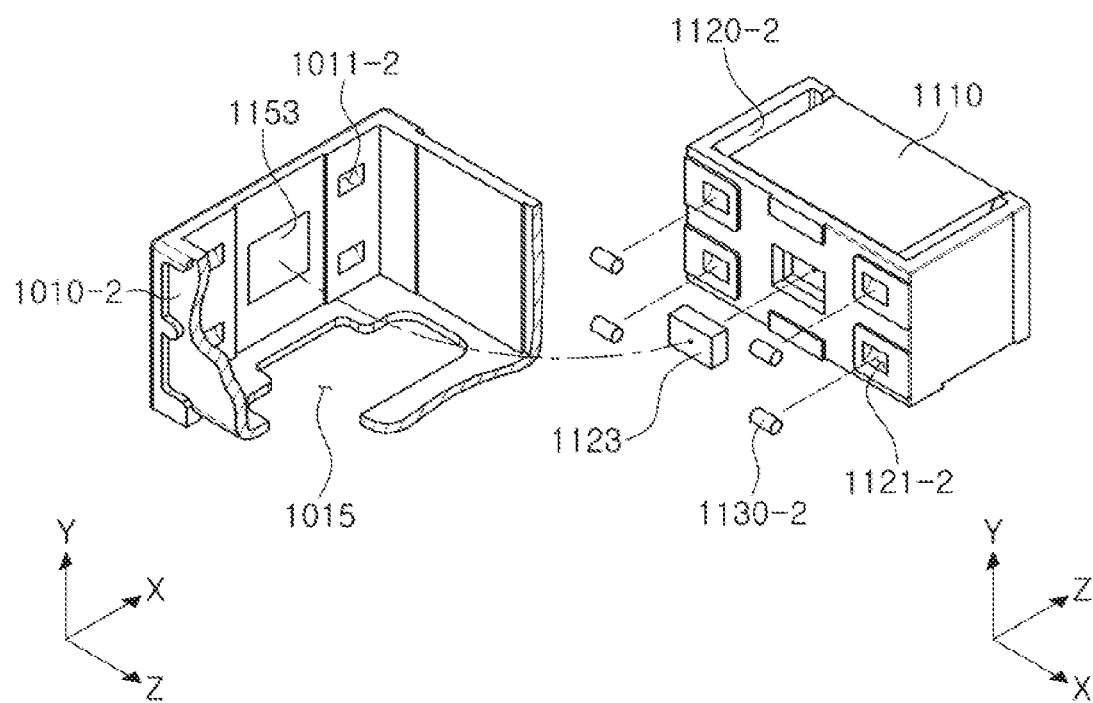

In each case, the seating grooves 1011-2 and 1121-2 are provided in shapes corresponding to that of the first ball bearings (see FIGS. 16A and 16B). Meanwhile, a case in which two third ball bearings 1130-2 are provided is illustrated in FIG. 16B, but one or two or more third ball bearings 1130-2 extended to be elongate in the second axis direction (the Y-axis direction) may also be provided.

The third ball bearings 1130-2 are provided between facing surfaces of the moving holder 1120-2 and the housing 1010-2. In addition, the moving holder 1120-2 is supported by the housing 1010-2 with the third ball bearings 1130-2 interposed therebetween by the attractive force between the pulling magnet 1123 or the pulling yoke provided in the moving holder 1120-2 and the pulling yoke 1153 or the pulling magnet provided in the housing 1010-2.

In addition, the housing 1010-2 is provided with the seating grooves 1011-2 into which the third ball bearings 1130-2 are partially inserted, and the moving holder 1120-2 is also provided with the seating grooves 1121-2 into which the third ball bearings 1130-2 are partially inserted. In this case, the moving holder 1120-2 needs to be rolled or slid in the second axis direction (the Y-axis direction), and some of the seating grooves 1011-2 and 1121-2 are provided to be elongate in the second axis direction (the Y-axis direction).

The seating grooves 1011-2 and 1121-2 described above may be provided in hemispherical or poly-pyramidal groove shapes so that the third ball bearings 1130-2 are easily rolled or slid (depths of the seating grooves 1011-2 and 1121-2 may be smaller than radii thereof in order for the third ball bearings 1130-2 to be easily rotated. The third ball bearings 1130-2 do not entirely enter the seating grooves, but are partially exposed, such that the moving holder 1120-2 is easily rolled or slid). In addition, positions and the numbers of seating grooves 1011-2 and 1121-2 correspond to those of the third ball bearings 1130-2 aligned on the second axis (the Y axis).

Meanwhile, the third ball bearings 1130-2 may have a structure in which they are fixedly provided in at least one of the housing 1010-2 and the moving holder 1120-2. For example, the third ball bearings 1130-2 may be fixedly provided in the housing 1010-2 or the moving holder 1120-2. In this case, only a member facing a member in which the third ball bearings 1130-2 are fixedly provided is provided with the seating grooves. In this case, the third ball bearings 1130-2 serve as friction bearings by sliding of the third ball bearings rather than rotation of the third ball bearings.

When the third ball bearings 1130-2 have the structure in which they are fixedly provided in any one of the housing 1010-2 and the moving holder 1120-2, the third ball bearings 1130-2 may be provided in a spherical or hemispherical shape (a case in which the third ball bearings are provided in the hemispherical shape is an example, and the third ball bearings may also have a protrusion length greater or smaller than a hemisphere). As described above, a case in which the third ball bearings 1130-2 are provided in the cylindrical shape extended on the first axis (the X axis) may also be similarly applied.

In addition, the third ball bearings 1130-2 may be separately manufactured and be then attached to any one of the housing 1010-2 and the moving holder 1120-2. Alternatively, the third ball bearings 1130-2 may be provided integrally with the housing 1010-2 or the moving holder 1120-2 at the time of manufacturing the housing 1010-2 and the moving holder 1120-2.

When power is applied to the coil 1141*b*, the moving holder 1120 in which the magnet 1141*a* is mounted moves linearly in the second axis direction (the Y-axis direction) by electromagnetic interaction between the magnet 1141*a* and the coil 1141*b*.

Figure 17A:
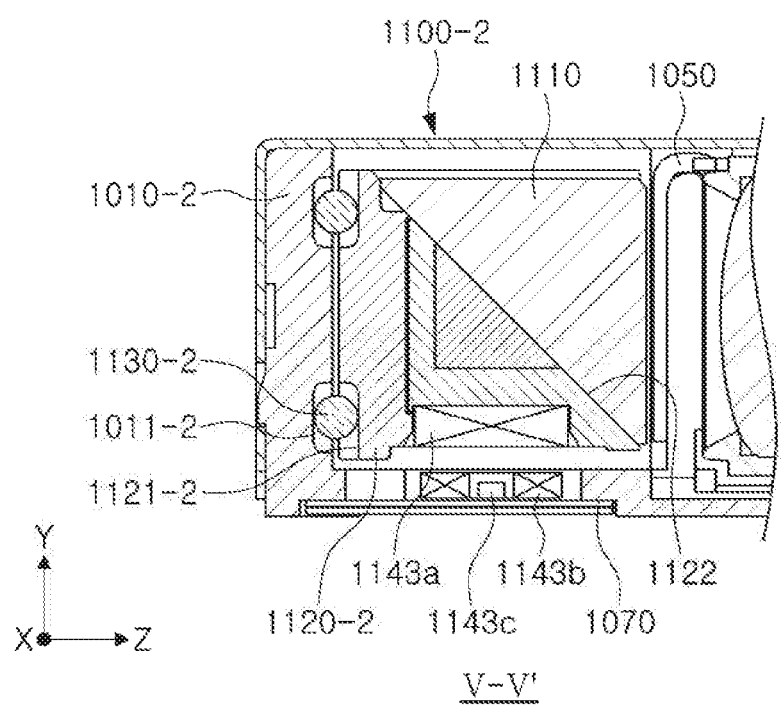
FIGS. 17A through 17C are schematic views of an example in which a moving holder according to an embodiment is moved linearly on a second axis (a Y axis).
Figure 17B:
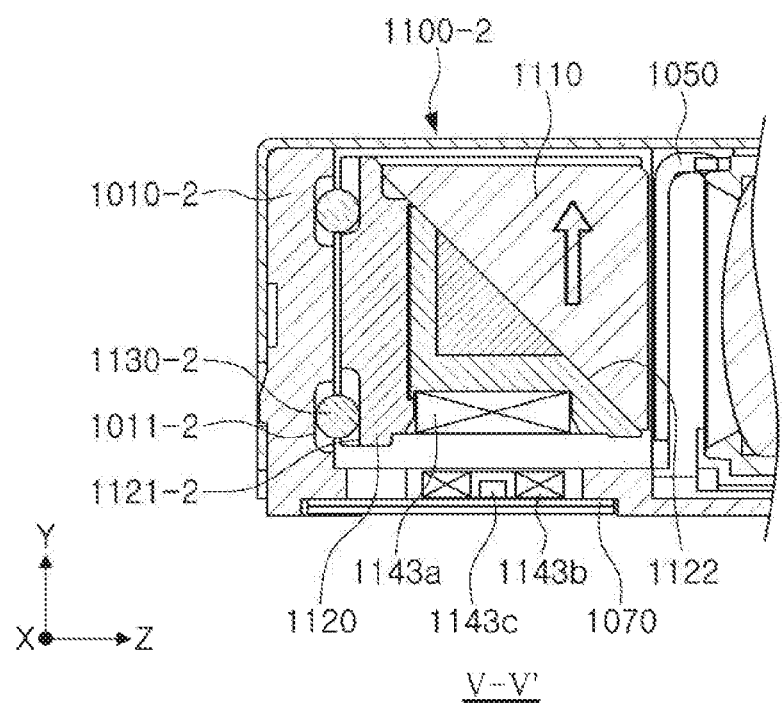
Figure 17C:
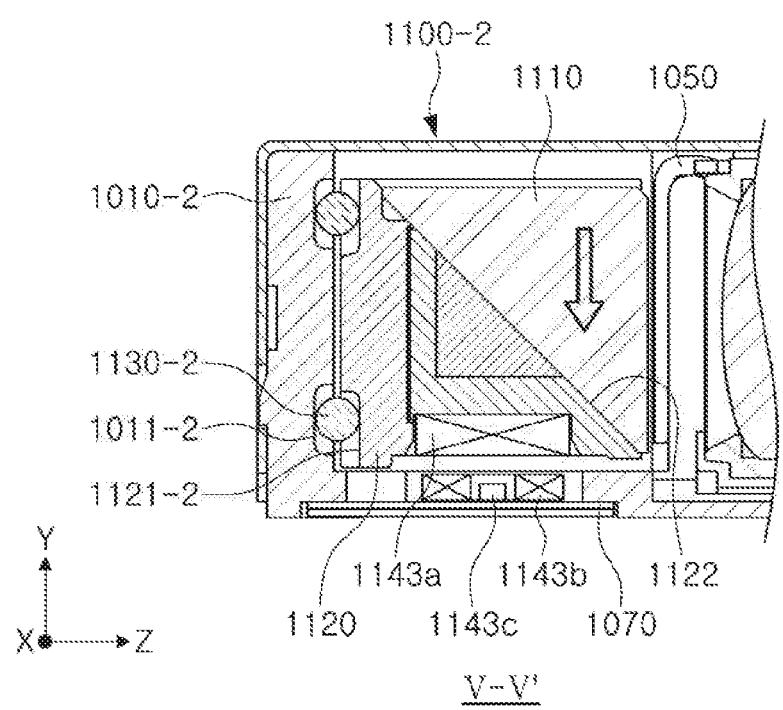

FIGS. 17A through 17C are schematic views illustrating an example in which a moving holder according to an embodiment is moved linearly on a second axis.

Referring to FIGS. 17A through 17C, when the moving holder 1120-2 is moved linearly along the second axis (the Y axis) in order to perform the OIS (OIS Y) in the Y-axis direction, the moving holder 1120-2 is moved linearly in the second axis direction (the Y-axis direction) on the basis of (rolling or sliding) the third ball bearings 1130-2 provided as two or more sets 1130*a* and 1130*b* on the inner surface of the housing 1010-2 and arranged along the second axis (the Y axis)

Referring to FIGS. 11A through 11C, when the lens barrel 1220 is moved linearly along the first axis (the X axis) in order to perform the OIS (OIS X) in the X-axis direction, the lens barrel 1220 is moved linearly in the first axis direction (the X-axis direction) on the basis of the second ball bearings 1250 provided as two or more sets in the carrier 1210 and arranged in the first axis (the X axis), similar to previous embodiments.

That is, in the camera module 1002 according to an embodiment, the lens barrel 1220 provided in the lens module 1200 is moved linearly in the first axis direction (the X-axis direction) with respect to the carrier 1210 in order to perform the OIS (OIS X) in the X-axis direction, and the moving holder 1120-2 provided in the reflecting module 1100-2 is moved linearly in the second axis direction (the Y axis direction) with respect to the housing 1010-2 in order to perform the OIS (OIS Y) in the Y-axis direction.

Figure 18:
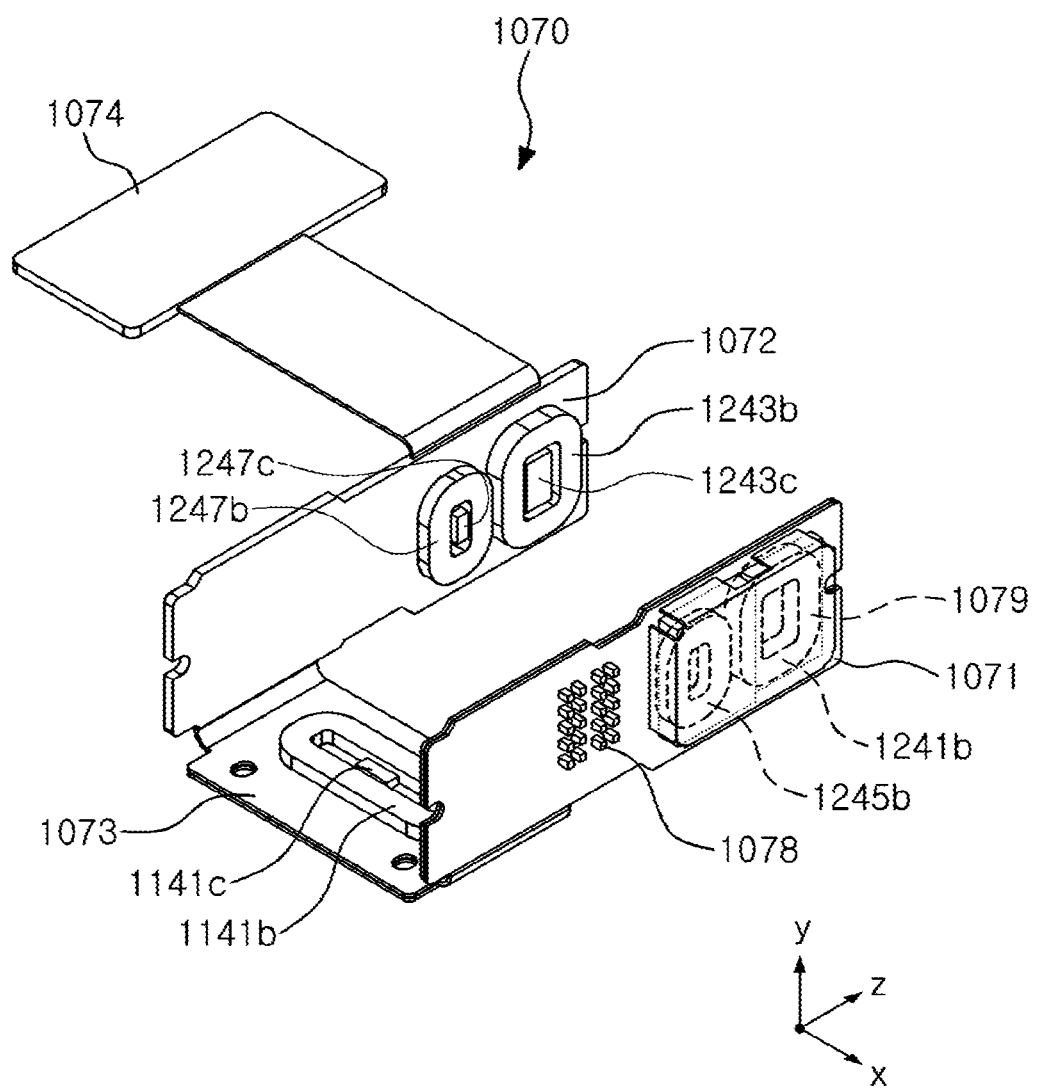
FIG. 18 is a perspective view of a main board according to embodiments and coils and components mounted on the main board.

FIG. 18 is a perspective view illustrating a main board according to an embodiment and coils and components mounted on the main board.

Referring to FIG. 18, the coil 1141*b* of the first driving part 1140 for driving the reflecting module 1100 or 1100-2 and the coils 1241*b*, 1243*b*, 1245*b*, and 1247*b* of the second driving part 1240 for driving the lens module 1200 are mounted on an inner surface of the main board 1070 according to an embodiment. In addition, components 1078 such as various passive elements, active elements, and the like, a gyro sensor 1079, and the like, may be mounted on an outer surface of the main board 1070. Therefore, the main board 1070 may be a double-sided substrate.

In detail, the main board 1070 includes a first side substrate 1071 and a second side substrate 1072 disposed approximately parallel to each other, and a bottom substrate 1073 connecting the first side substrate 1071 and the second side substrate 1072 to each other, and a terminal part 1074 for connection of an external power supply and a signal may be connected to any one of the first side substrate 1071, the second side substrate 1072, and the bottom substrate 1073.

Some 1241*b* and 1245*b* (see FIG. 18) of the coils 1241*b*, 1243*b*, 1245*b*, and 1247*b* of the second driving part 1240 for driving the lens module 1200 are mounted on the first side substrate 1071.

Some 1243*b* and 1247*b* (see FIG. 18) of the coils 1241*b*, 1243*b*, 1245*b*, and 1247*b* of the second driving part 1240 for driving the lens module 1200 and the sensors 1243*c* and 1247*c* sensing the positions of the carrier 1210 and the lens barrel 1220 of the lens module 1200 are mounted on the second side substrate 1702.

The coil 1141*b* of the first driver 1140 for driving the reflecting module 1100 and the sensor 1141*c* of the first driver 1140 for sensing the position of the reflecting module 1100 is mounted on the bottom substrate 1073.

An example in which the components 1078 such as the various passive elements and active elements, and the gyro sensor 1079, are mounted on the first side substrate 1071 is illustrated in the drawing, but the components 1078 such as the various passive elements and active elements, and the gyro sensor 1079, may be mounted on the second side surface 1072 or be appropriately distributed and mounted onto the first side substrate 1071 and the second side substrate 1072.

In addition, the coils 1241*b*, 1243*b*, 1245*b*, and 1247*b* and the position sensors 1141*c*, 1243*c*, and 1247*c* mounted on the first side substrate 1071, the second side substrate 1072, and the bottom substrate 1073 are variously distributed and mounted onto the respective substrates depending on a design of the camera module.

Figure 19:
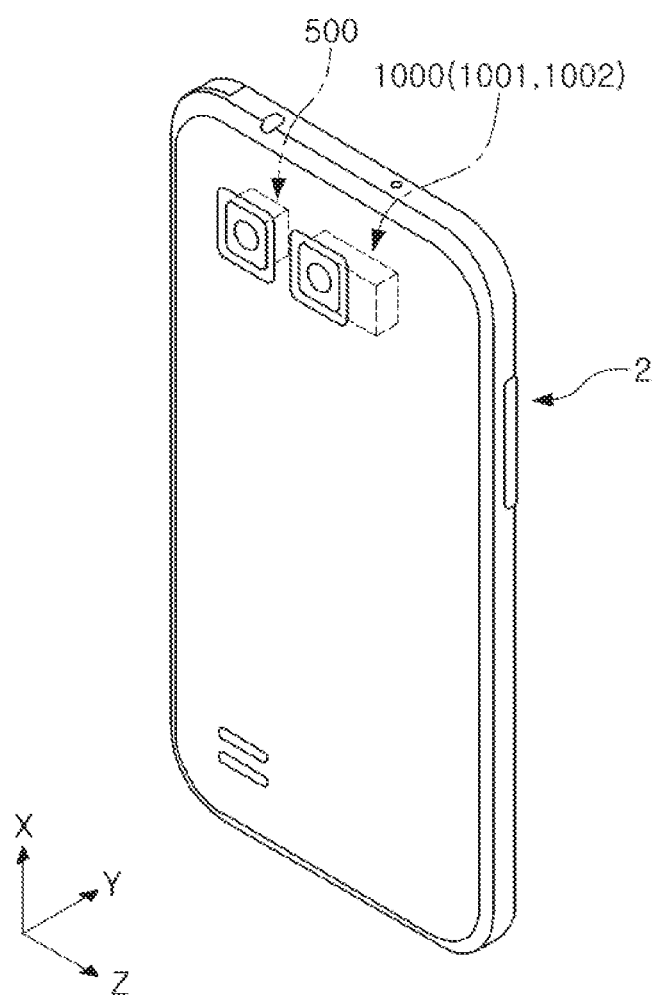
FIG. 19 is a perspective view of a portable electronic device according to another embodiment.

FIG. 19 is a perspective view illustrating a portable electronic device according to another embodiment.

Referring to FIG. 19, a portable electronic device 2 according to another embodiment may be a portable electronic device such as a mobile communications terminal, a smartphone, a tablet personal computer (PC), or the like, in which a plurality of camera modules 500 and 1000 are mounted.

In this embodiment, the camera modules 500 and 1000 are mounted in the portable electronic device 2.

One or more of the camera modules 500 and 1000 is the camera module 1000 according to the embodiments described with reference to FIGS. 2 through 18.

That is, a portable electronic device including a dual camera module includes the camera module 1000 according to an embodiment as one or both of two camera modules.

As set forth above, the camera module and the portable electronic device including the same according to embodiments may have a simple structure and a reduced size while implementing the auto-focusing function, the zoom function, and the OIS function. In addition, power conduction is significantly reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. The camera module comprising:
   a reflecting module comprising a reflecting member configured to be movable in one axis direction substantially perpendicular to an optical axis direction; and
   a lens module disposed behind the reflecting module, comprising at least one lens barrel comprising lenses aligned in the optical axis direction configured such that light reflected from the reflecting member is incident to the lenses,
   wherein one lens barrel of the at least one lens barrel is configured to be movable in an other axis direction substantially perpendicular to the optical axis direction and the one axis direction,
   wherein the one lens barrel is supported on two or more first ball bearings and moved on the two or more first ball bearings, and
   wherein the reflecting module comprises a moving holder movably supported by an inner wall of a housing with two or more second ball bearings disposed between the moving holder and the housing, and the moving holder is configured to be rotatable around the other axis with respect to the housing.

2. The camera module of claim 1, wherein the two or more second ball bearings are aligned on the other axis.

3. The camera module of claim 2, wherein the two or more second ball bearings are disposed in the moving holder or the housing to be freely movable.

4. The camera module of claim 3, wherein the two or more second ball bearings have a spherical or a cylindrical shape.

5. The camera module of claim 2, wherein the two or more second ball bearings are fixedly disposed in the moving holder or the housing.

6. The camera module of claim 5, wherein the two or more second ball bearings have a spherical shape, a hemispherical shape, a cylindrical shape, a semi-cylindrical shape, or a rounded protrusion shape.

7. The camera module of claim 1,
   wherein the moving holder is configured to move linearly along the one axis with respect to the housing.

8. The camera module of claim 1, further comprising two or more ball bearing sets disposed between the moving holder and the housing, wherein the two or more ball bearing sets are disposed aligned in the one axis direction.

9. The camera module of claim 8, wherein the ball bearing sets are fixedly disposed in the moving holder or the housing or are provided in the moving holder or the housing to be freely movable.

10. The camera module of claim 1, further comprising a pulling yoke and a pulling magnet, wherein the pulling yoke is disposed in one of the moving holder and the housing, and the pulling magnet is disposed in the other of the moving holder and the housing, and
    wherein the moving holder is supported by the inner wall of the housing by attractive force between the pulling yoke and the pulling magnet.

11. The camera module of claim 1, wherein the lens module comprises a carrier supporting the lens barrel, and;
    wherein two or more ball bearing sets aligned in the other axis direction are disposed between the lens barrel and the carrier.

12. The camera module of claim 1, wherein the lens module comprises a carrier supporting the lens barrel, and;
    wherein the lens barrel comprises a pulling yoke allowing the lens barrel to be supported by the carrier by attractive force between the pulling yoke and a driving magnet of the carrier.

13. The camera module of claim 1, wherein the lens module comprises a carrier supporting the lens barrel, and; and,
    wherein the carrier comprises a stopper preventing separation of the lens barrel.

14. The camera module of claim 1, wherein the lens module comprises a carrier supporting the lens barrel, and;
    wherein the carrier is configured to be movable in the optical axis direction with respect to a housing.

15. The camera module of claim 1, further comprising a main board disposed on side surfaces and a bottom surface of a housing, wherein the main board comprises coils for driving the lens module and the reflecting module mounted thereon.

16. The camera module of claim 15, wherein the main board is a double-sided substrate,
    the coils are mounted on an inner surface of the main board toward the internal space of the housing, and
    a gyro sensor is mounted on an outer surface of the main board opposing the inner surface of the main board.

17. A portable electronic device comprising the camera module of claim 1.

18. The portable electronic device of claim 17, wherein the optical axis direction is generally perpendicular to a thickness direction of the portable electronic device.

19. A camera module comprising:
    a reflecting module comprising a reflecting member configured to be movable in one axis direction substantially perpendicular to an optical axis direction; and
    a lens module disposed behind the reflecting module, comprising at least one lens barrel comprising lenses aligned in the optical axis direction configured such that light reflected from the reflecting member is incident to the lenses,
    wherein one lens barrel of the at least one lens barrel is configured to be movable in an other axis direction substantially perpendicular to the optical axis direction and the one axis direction,
    wherein the one lens barrel is supported on two or more first ball bearings and moved on the two or more first ball bearings, and
    wherein the reflecting module comprises a moving holder movably supported by an inner wall of a housing, and the moving holder is configured to move linearly along the one axis with respect to the housing.

20. The camera module of claim 19, further comprising two or more ball bearing sets disposed between the moving holder and the housing, wherein the two or more ball bearing sets are disposed aligned in the one axis direction.

21. The camera module of claim 20, wherein the ball bearing sets are fixedly disposed in the moving holder or the housing or are provided in the moving holder or the housing to be freely movable.

22. The camera module of claim 19, further comprising a pulling yoke and a pulling magnet, wherein the pulling yoke is disposed in one of the moving holder and the housing, and the pulling magnet is disposed in the other of the moving holder and the housing, and wherein the moving holder is supported by the inner wall of the housing by attractive force between the pulling yoke and the pulling magnet.

23. The camera module of claim 19, wherein the lens module comprises a carrier supporting the lens barrel, and wherein two or more ball bearing sets aligned in the other axis direction are disposed between the lens barrel and the carrier.

\* \* \* \* \*